United States Patent
Tandai et al.

(10) Patent No.: US 7,343,162 B2
(45) Date of Patent: Mar. 11, 2008

(54) WIRELESS COMMUNICATION METHOD, WIRELESS COMMUNICATION APPARATUS, AND WIRELESS COMMUNICATION SYSTEM

(75) Inventors: Tomoya Tandai, Tokyo (JP); Tomoko Adachi, Urayasu (JP); Tetsu Nakajima, Yokohama (JP); Yoriko Utsunomiya, Tokyo (JP); Yasuyuki Nishibayashi, Kawasaki (JP); Masahiro Takagi, Tokyo (JP); Daisuke Takeda, Kawasaki (JP); Kazumi Sato, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 77 days.

(21) Appl. No.: 11/153,437

(22) Filed: Jun. 16, 2005

(65) Prior Publication Data

US 2005/0282551 A1 Dec. 22, 2005

(30) Foreign Application Priority Data

Jun. 17, 2004 (JP) ............................. 2004-180125

(51) Int. Cl.
*H04Q 7/20* (2006.01)
(52) U.S. Cl. .................. 455/450; 455/447; 455/509; 455/519; 455/448; 455/426.1
(58) Field of Classification Search ................ 455/447, 455/450, 452.1, 41.2, 509, 519, 448, 426.1
See application file for complete search history.

(56) References Cited

U.S. PATENT DOCUMENTS

| | | | | |
|---|---|---|---|---|
| 5,515,366 | A * | 5/1996 | Chieu et al. ................. | 370/347 |
| 6,522,886 | B1 * | 2/2003 | Youngs et al. .............. | 455/450 |
| 6,580,704 | B1 | 6/2003 | Wellig et al. | |
| 2004/0048609 | A1 * | 3/2004 | Kosaka ..................... | 455/422.1 |
| 2004/0203815 | A1 * | 10/2004 | Shoemake et al. .......... | 455/450 |
| 2005/0254449 | A1 * | 11/2005 | Halfmann et al. .......... | 370/328 |
| 2005/0282551 | A1 | 12/2005 | Tandai et al. | |
| 2006/0192708 | A1 | 8/2006 | Tandai et al. | |
| 2006/0252369 | A1 * | 11/2006 | Rasanen ...................... | 455/39 |

FOREIGN PATENT DOCUMENTS

| | | |
|---|---|---|
| EP | 1 379 026 A1 | 1/2004 |
| JP | 2003-249939 | 9/2003 |
| JP | 2004-23143 | 1/2004 |

OTHER PUBLICATIONS

U.S. Appl. No. 11/557,636, filed Nov. 8, 2006, Takagi et al.

* cited by examiner

*Primary Examiner*—Barry Taylor
(74) *Attorney, Agent, or Firm*—Oblon, Spivak, McClelland, Maier & Neustadt, P.C.

(57) ABSTRACT

In a wireless communication system having a wireless base station, wireless terminal stations belonging to a first group which performs wireless communication while sharing different frequency channels, and wireless terminal stations belonging to a second group which performs wireless communication by using one frequency channel, a first communication period and a second communication period is alternately repeated. In this system, a wireless terminal station belonging to the first or the second group communicates with the wireless base station by using a first frequency channel in the first communication period. Direct communication between two wireless terminal stations belonging to the first group by using a second frequency channel without through the wireless base station is performed in the first communication period. Then, a wireless terminal station belonging to the first group communicates with the wireless base station by using both the first and the second frequency channels.

12 Claims, 22 Drawing Sheets

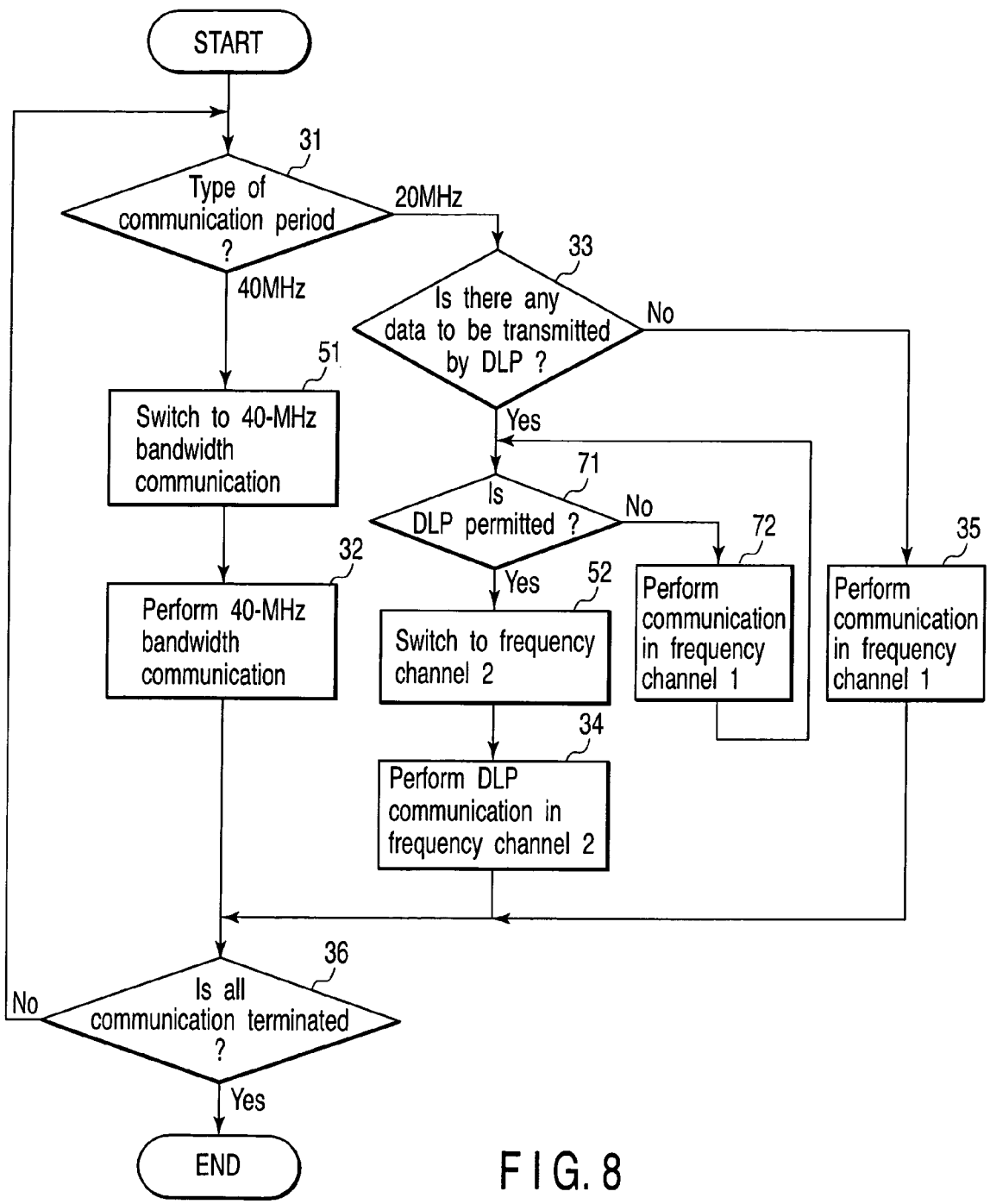
F I G. 8

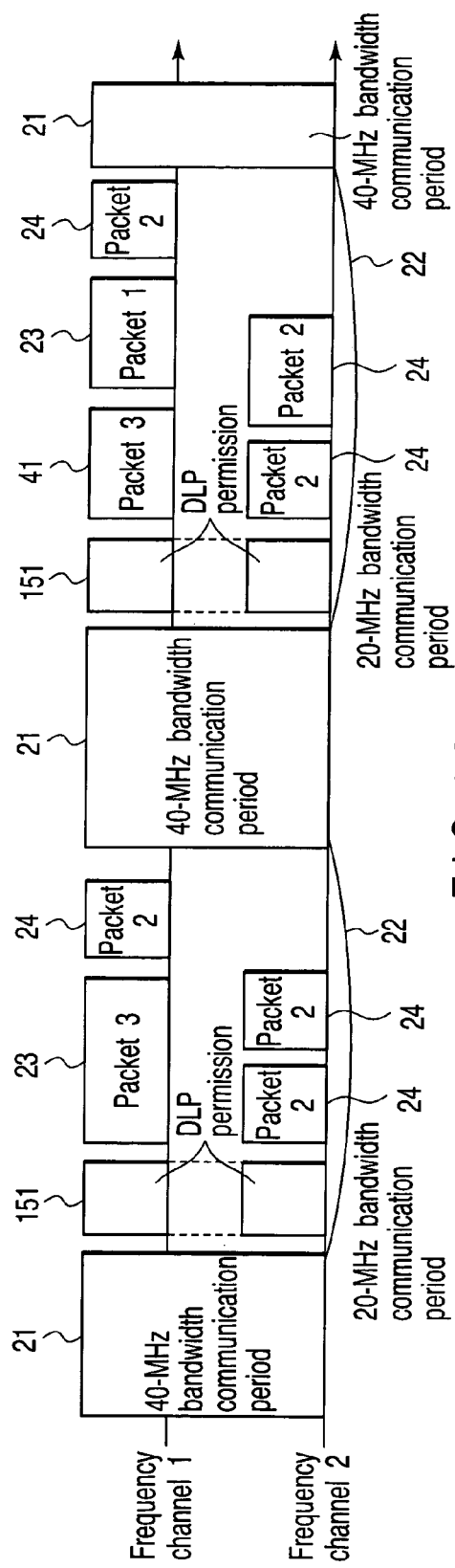
F I G. 16
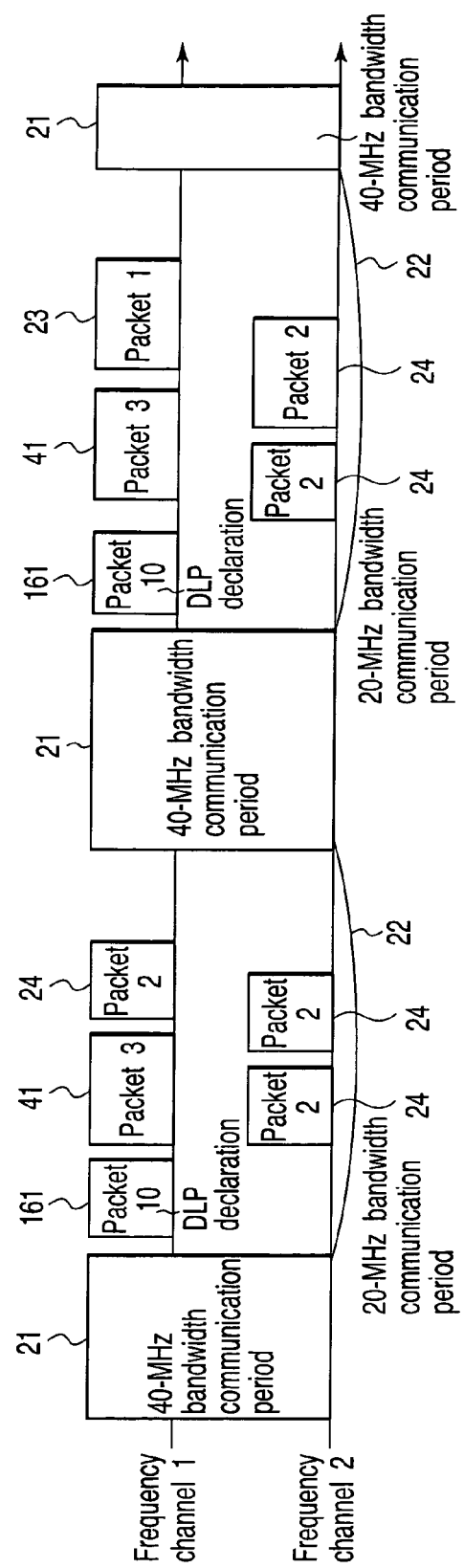
F I G. 17

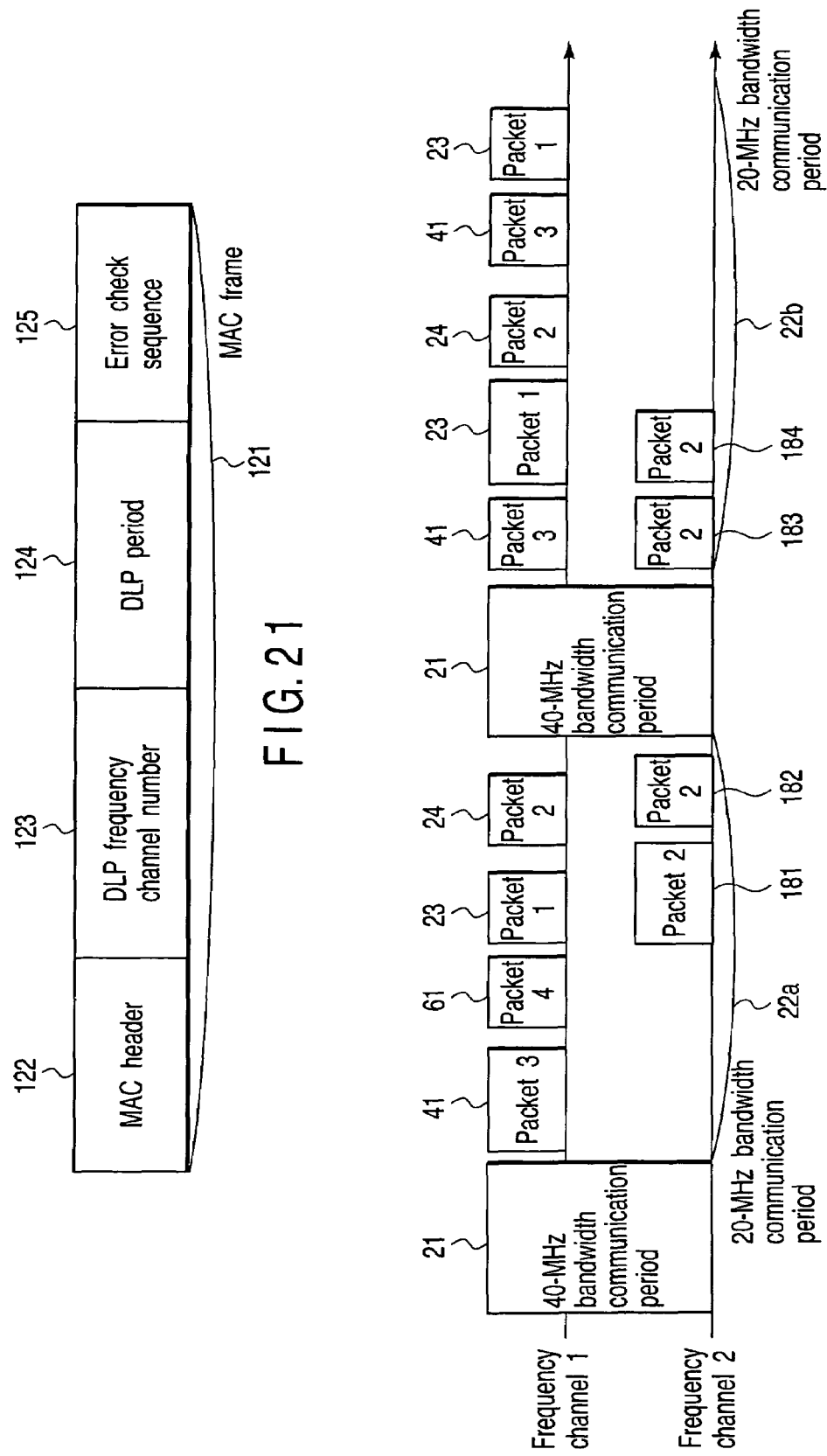

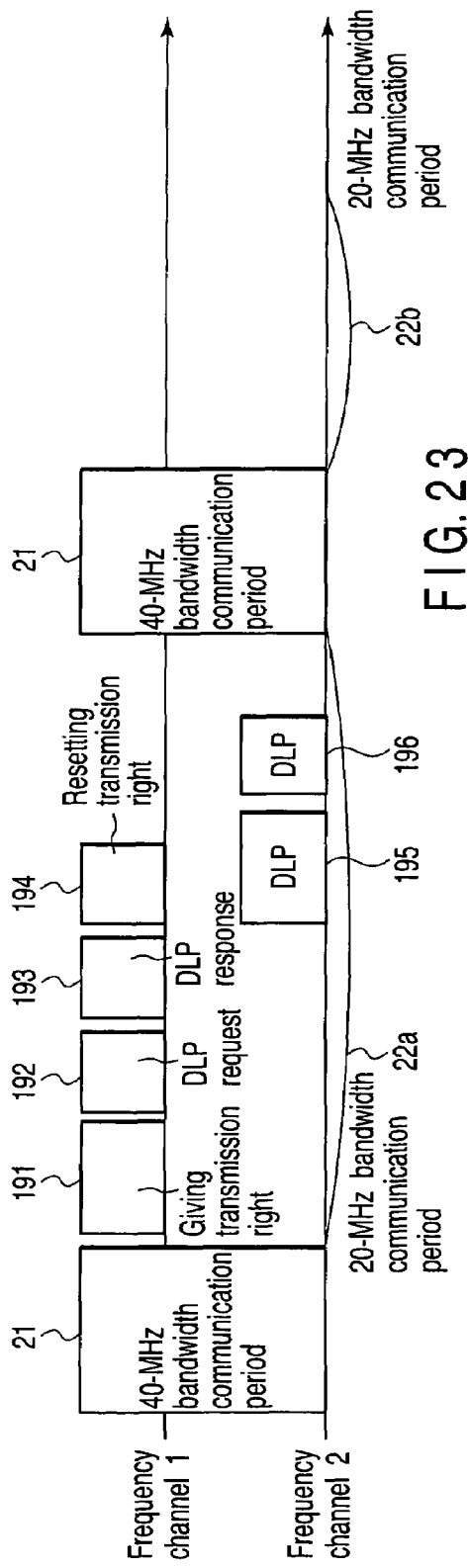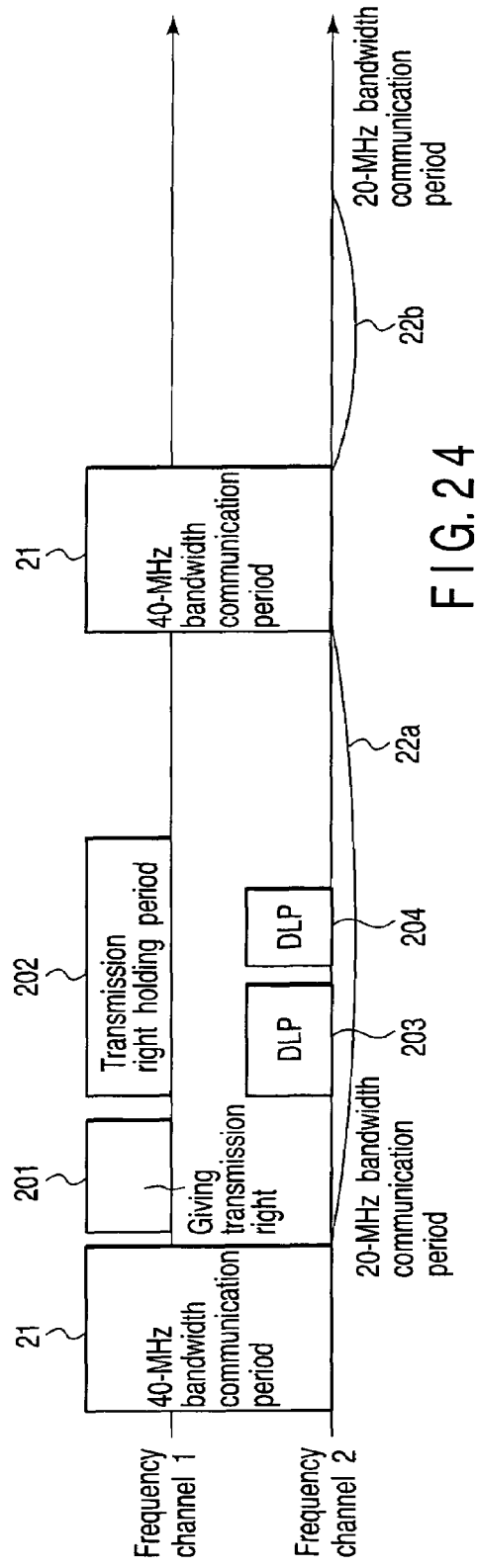

WIRELESS COMMUNICATION METHOD, WIRELESS COMMUNICATION APPARATUS, AND WIRELESS COMMUNICATION SYSTEM

CROSS-REFERENCE TO RELATED APPLICATIONS

This application is based upon and claims the benefit of priority from prior Japanese Patent Application No. 2004-180125, filed Jun. 17, 2004, the entire contents of which are incorporated herein by reference.

BACKGROUND OF THE INVENTION

1. Field of the Invention

The present invention relates to a wireless communication method, wireless communication apparatus, and wireless communication system in which a plurality of wireless communication apparatuses perform high-throughput wireless communication while sharing a plurality of different frequency channels.

2. Description of the Related Art

There has been proposed a wireless communication system in which a plurality of wireless communication apparatuses perform high-throughput wireless communication while sharing a plurality of different frequency channels (see Jpn. Pat. Appln. KOKAI Publication No. 2004-23143). In a conventional wireless communication system of this type, a base station serves as an entity to control frame exchange in all frequency channels. In addition, wireless communication to be performed in all frequency channels is limited to that between the base station and the mobile stations.

When the base station is to serve as an entity to control frame exchange in all frequency channels, the control in the base station obviously becomes complicated. When data is to be transmitted from a given mobile station to another mobile station, the data from the transmission source mobile station is transmitted first to the base station. The base station then transmits the data from the transmission source mobile station to the destination mobile station. That is, data to be transmitted from a mobile station to another mobile station always passes through the base station. In this case, the overall data transmission efficiency of the system is not necessarily good.

BRIEF SUMMARY OF THE INVENTION

It is an object of the present invention to improve the channel utilization efficiency in a period in which a legacy wireless terminal can communicate in a wireless communication system wherein, a terminal which can increase the bandwidth of a frequency channel and perform high-throughput wireless communication coexists with the legacy wireless terminal which cannot perform such high-throughput wireless communication.

A wireless communication system according to an aspect of the present invention is configured such that terminal stations can perform direct communication without through a base station in at least one of a plurality of frequency channels.

(1) A wireless communication method according to an embodiment of the present invention is a wireless communication method in a wireless communication system in which two different frequency channels are shared, wherein the first and second communication periods are alternately repeated, and at least two wireless terminal stations start direct communication in the first or second frequency channel without through a wireless base station in the first communication period.

According to the wireless communication method described in (1), a base station and a terminal station communicate with each other in one 20 MHz bandwidth during a 20 MHz period, and terminal stations perform direct communication in the other 20 MHz bandwidth, thereby effectively using frequency channels.

(2) A wireless communication method according to an embodiment of the present invention is a wireless communication method in the wireless communication system, in which in the first communication period, at least two wireless terminal stations belonging to the first group perform direct communication in the second frequency channel without through the wireless base station, and at least one wireless terminal station belonging to the second group or the wireless base station performs communication in the first frequency channel.

According to the wireless communication method described in (2), in a 20 MHz period, a legacy terminal and a base station communicate with each other in one 20 MHz bandwidth, and high throughput terminals perform direct communication in the other 20 MHz bandwidth, thereby effectively using frequency channels.

(3) A wireless communication method according to an embodiment of the present invention is the wireless communication method described in (2), in which direct communication between at least two wireless terminal stations belonging to the first group which is performed in the second frequency channel without through the wireless base station during the first communication period is started after the wireless base station transmits a frame containing information indicating the permission of direct communication in the first frequency channel.

According to the wireless communication method described in (3), in a 20 MHz period, after a base station transmits a direct communication permission frame, a legacy terminal and a base station communicate with each other in one 20 MHz bandwidth and high throughput terminals perform direct communication in the other 20 MHz bandwidth, thereby efficiently realizing the effective utilization of frequency channels.

(4) A wireless communication method according to an embodiment of the present invention is the wireless communication method described in (3), in which the frame containing the information indicating the permission of direct communication which the wireless base station transmits in the first frequency channel is transmitted after the wireless base station receives a frame containing information indicating a direct communication request from a wireless terminal station belonging to the first group.

According to the wireless communication method described in (4), only when a high throughput terminal needs to perform direct communication, the terminal outputs a direct communication request to a base station, and performs direct communication after a permission is obtained, thereby efficiently realizing the effective utilization of frequency channels.

(5) A wireless communication method according to an embodiment of the present invention is the wireless communication method described in (4), in which the frame containing the information indicating the direct communication request which the wireless terminal station belonging to the first group transmits to the wireless base station is transmitted after the first wireless terminal station belonging to the first group transmits a frame containing information indicating a direct communication request to the second wireless terminal station belonging to the first group which is requested to perform direct communication, and the first wireless terminal station belonging to the first group receives a frame containing information indicating the acceptance of direct communication from the second wireless terminal station belonging to the first group.

According to the wireless communication method described in (5), a high throughput terminal sends a request to another high throughput terminal with which direct communication is desired to be performed, and outputs a direct communication request to a base station upon receiving a permission from the another high throughput terminal, thereby efficiently performing direct communication.

(6) A wireless communication method according to an embodiment of the present invention is the wireless communication method described in (5), in which the contents of the frame indicating the direct communication request which the first wireless terminal station belonging to the first group transmits to the second wireless terminal station belonging to the first group which is requested to perform direct communication contain at least one of the number of a frequency channel in which direct communication is performed and the period of direct communication.

According to the wireless communication method described in (6), containing the number of a frequency channel in which direct communication is performed and the period of direct communication in the contents of the frame which the high throughput terminal transmits to the high throughput terminal which is requested to perform direct communication makes it possible for the another high throughput terminal to easily determine whether or not to accept direct communication.

(7) A wireless communication method according to an embodiment of the present invention is the wireless communication method described in (4), in which the contents of the frame indicating the direct communication request which the wireless terminal station belonging to the first group transmits to the wireless base station contain at least one of the number of a frequency channel in which direct communication is performed, the period of direct communication performed by at least two wireless terminal stations belonging to the first group, and the identifier of at least one wireless terminal station belonging to the first group which performs direct communication.

According to the wireless communication method described in (7), containing the period of direct communication and the address of another terminal with which direct communication is to be performed in the direct communication request frame which the high throughput terminal transmits to the base station makes it possible for the base station to efficiently determine whether or not to permit direct communication.

(8) A wireless communication method according to an embodiment of the present invention is the wireless communication method described in (3), in which the contents of the frame indicating the permission of direct communication which the wireless base station transmits in the first frequency channel contain at least one of the start time of direct communication performed by at least two wireless terminal stations belonging to the first group, the period of direct communication performed by at least two wireless terminal stations belonging to the first group, the number of a frequency channel in which at least two wireless terminal stations belonging to the first group perform direct communication, and the identifiers of at least two wireless terminal stations belonging to the first group which perform direct communication.

According to the wireless communication method described in (8), containing the start time of direct communication, the period of direct communication, the number of a frequency channel in which direct communication is performed, and the address of a terminal which performs direct communication in the direct communication permission frame which the base station transmits makes it possible to reliably perform direct communication, and at the same time another terminal which is notified of this can obtain information associated with the terminals which are performing direct communication, thereby efficiently performing frame exchange.

(9) A wireless communication method according to an embodiment of the present invention is the wireless communication method described in (3), in which the frames indicating the permission of direct communication which the wireless base station transmits are simultaneously transmitted in the first and second frequency channels.

According to the wireless communication method described in (9), when another terminal station exists in the second frequency channel, the start of direct communication between high throughput terminal stations in the second frequency channel can be indicated in advance.

(10) A wireless communication method according to an embodiment of the present invention is the wireless communication method described in (9), in which at least a frame indicating the permission of direct communication which is transmitted in the second frequency channel, of the frames indicating the permission of direct communication which the wireless base station simultaneously transmits in both the first and second frequency channels, contains information indicating that a time during which direct communication is to be performed is reserved in advance.

According to the wireless communication method described in (10), reserving a bandwidth in which direct communication is performed between high throughput terminals in the second frequency channel makes it possible to perform direct communication without any interference.

(11) A wireless communication method according to an embodiment of the present invention is the wireless communication method described in (2), in which direct communication performed by at least two wireless terminal stations belonging to the first group in the second frequency channel without through the wireless base station during the first communication period is started after a wireless terminal station belonging to the first group transmits a frame containing information indicating the declaration of direct communication in the first frequency channel.

According to the wireless communication method described in (11), making high throughput terminals declare the execution of direct communication before direct communication in one 20 MHz bandwidth allows other terminals to grasp information about the terminals which are performing direct communication, thereby performing efficient frame exchange.

(12) A wireless communication method according to an embodiment of the present invention is the wireless communication method described in (11), in which the frame containing information indicating the declaration of direct communication which the first wireless terminal station transmits in the first frequency channel is transmitted after the first wireless terminal station belonging to the first group transmits a frame containing information indicating a direct communication request to the second wireless terminal station belonging to the first group which is requested to perform direct communication, and the first wireless terminal station belonging to the first group receives a frame containing information indicating the acceptance of direct communication from the second wireless terminal station belonging to the first group.

According to the wireless communication method described in (12), a high throughput terminal sends a direct communication request to another high throughput terminal for which direct communication is desired, and declares direct communication upon receiving an acceptance from the another high throughput terminal, thereby reliably performing direct communication.

(13) A wireless communication method according to an embodiment of the present invention is the wireless communication method described in (12), in which the contents of the frame indicating a desire to perform direct communication which the first wireless terminal station belonging to the first group transmits to the second wireless terminal station belonging to the first group contains the number of a frequency channel in which direct communication is performed and the period of direct communication.

According to the wireless communication method described in (13), since the number of a frequency channel in which direct communication is performed and the period of direct communication are contained in the contents of the frame which the high throughput terminal transmits to the another high throughput terminal for which direct communication is desired, it is possible for the another high throughput terminal to easily determine whether or not to accept direct communication.

(14) A wireless communication method according to an embodiment of the present invention is the wireless communication method described in (11), in which the contents of the frame indicating the declaration of direct communication which the wireless terminal station belonging to the first group transmits in the first frequency channel contain at least one of the start time of direct communication performed by at least two wireless terminal stations belonging to the first group, the period of direct communication performed by at least two wireless terminal stations belonging to the first group, the number of a frequency channel in which at least two wireless terminal stations belonging to the first group perform direct communication, and the identifiers of at least two wireless terminal stations belonging to the first group which perform direct communication.

According to the wireless communication method described in (14), since the start time of direct communication, the period of direct communication, the number of a frequency channel in which direct communication is performed, and the address of a terminal which performs direct communication are contained in the direct communication declaration frame which a high throughput terminal transmits, it is possible to reliably perform direct communication, and another terminal which is notified of this can obtain information associated with the terminals which are performing direct communication, thereby efficiently performing frame exchange.

(15) A wireless communication method according to an embodiment of the present invention is the wireless communication method described in (2), in which direct communication to be performed by at least two wireless terminal stations belonging to the first group in the second frequency channel without through the wireless base station in the first communication period is performed when data to be transmitted is left in direct communication performed by the two wireless terminal stations belonging to the first group in at least an immediately preceding first communication period.

According to the wireless communication method described in (15), if data to be transmitted is left in direct communication in the preceding 20 MHz period, direct communication is performed in the current 20 MHz period, thereby efficiently using frequency channels.

(16) A wireless communication method according to an embodiment of the present invention is the wireless communication method described in (2), in which direct communication to be performed by at least two wireless terminal stations belonging to the first group in the second frequency channel without through the wireless base station in the first communication period is performed when data to be transmitted is left in direct communication performed by the two wireless terminal stations belonging to the first group in at least an immediately preceding second communication period.

According to the wireless communication method described in (16), if data to be transmitted is left in direct communication in the preceding 40 MHz period, direct communication is performed in the current 40 MHz period, thereby efficiently using frequency channels.

(17) A wireless communication method according to an embodiment of the present invention is the wireless communication method described in (2), in which direct communication performed by at least two wireless terminal stations belonging to the first group in the second frequency channel without through the wireless base station in the first communication period is started after the wireless base station gives a transmission right to the first wireless terminal station belonging to the first group in the first communication period, the first wireless terminal station belonging to the first group to which the transmission right is given requests the second wireless terminal station belonging to the first group to perform direct communication in the second frequency channel, and the second wireless terminal station belonging to the first group transmits a frame containing information indicating the acceptance of direct communication.

According to the wireless communication method described in (17), when a TXOP is given to a high throughput terminal by a base station in a 20 MHz period, the high throughput terminal sends a DLP request to another high throughput terminal with which DLP is to be performed, and starts DLP upon reception of an acceptance, thereby efficiently realizing effective utilization of frequency channels.

(18) A wireless communication method according to an embodiment of the present invention is the wireless communication method described in (17), in which after the second wireless terminal station belonging to the first group transmits a frame containing information indicating an acceptance, the wireless base station transmits a frame containing information indicating the cancellation of the transmission right given to the first wireless terminal station belonging to the first group in the first frequency channel.

According to the wireless communication method described in (18), when a high throughput terminal to which a transmission right is given starts DLP in the second frequency channel, the transmission right given to the high throughput terminal in the first frequency channel is canceled, thereby effectively using the first frequency channel.

(19) A wireless communication method according to an embodiment of the present invention is the wireless communication method described in (2), in which direct communication performed by at least two wireless terminal stations belonging to the first group in the second frequency channel without through the wireless base station in the first communication period is started after the wireless base station gives a transmission right to a wireless terminal station belonging to the first or second group in the first communication period, and recognizes that the wireless base station gives no transmission right to at least two wireless terminal stations belonging to the first group.

According to the wireless communication method described in (19), while a transmission right is given to another terminal in the first frequency channel and this source terminal performs transmission, the high throughput terminal performs DLP in the second frequency channel, thereby effectively using frequency channels.

(20) A wireless communication method according to an embodiment of the present invention is the wireless communication method described in (19), in which direct communication to be performed by at least two wireless terminal stations belonging to the first group in the second frequency channel after the wireless terminal stations recognize that no transmission right is given by the wireless base station is started after the execution of direct communication is determined by prior negotiation between at least two wireless terminal stations belonging to the first group.

According to the wireless communication method described in (20), a shift to direct communication can be efficiently made by performing direct communication after prior negotiation.

(21) A wireless communication method according to an embodiment of the present invention is the wireless communication method described in (20), in which when the prior negotiation between at least two wireless terminal stations belonging to the first group is performed between a plurality of wireless terminal stations belonging to the first group, the wireless base station gives a permission to direct communication between wireless terminal stations with respect a specific negotiation, and at least two wireless terminal stations belonging to the first group to which the permission is given perform direct communication in the second frequency channel.

According to the wireless communication method described in (21), when a plurality of prior negotiations are made, the wireless base station gives a permission to a specific terminal, thereby efficiently performing direct communication.

(22) A wireless communication method according to an embodiment of the present invention is the wireless communication method described in (2), in which during a period in which at least two wireless terminal stations belonging to the first group are performing direct communication in the second frequency channel during the first communication period, when the wireless base station receives, in the first frequency channel, data addressed to the wireless terminal station belonging to the first group which is performing direct communication in the second frequency channel, the wireless base station holds the data addressed to the wireless terminal station belonging to the first group.

According to the wireless communication method described in (22), when a base station receives data addressed to a high throughput terminal which is performing DLP in another frequency channel, the base station holds the data, thereby allowing the base station to transmit the data to the high throughput terminal at the next opportunity.

(23) A wireless communication method according to an embodiment of the present invention is the wireless communication method described in (2), in which in the first communication period, when at least two wireless terminal stations belonging to the first group perform direct communication in the second frequency channel without through the wireless base station, and at least one wireless terminal station belonging to the second group or the wireless base station performs communication in the first frequency channel, at least wireless communication in one frequency channel is performed at a low transmission rate.

According to the wireless communication method described in (23), when two frequency channels are adjacent to each other, transmission is preferably performed at a low transmission rate to reduce the influence of interference between the adjacent channels.

(24) A wireless communication method according to an embodiment of the present invention is the wireless communication method described in (2), in which in the first communication period, when at least two wireless terminal stations belonging to the first group perform direct communication in the second frequency channel without through the wireless base station, and at least one wireless terminal station belonging to the second group or the wireless base station performs communication in the first frequency channel, wireless communication in at least one frequency channel is performed by beam control using a plurality of antennas.

According to the wireless communication method described in (24), when two frequency channels are adjacent to each other, a beam forming technique using a plurality of antennas is preferably used to reduce the influence of interference between the adjacent channels.

(25) A wireless communication apparatus according to an embodiment of the present invention is a wireless terminal station which operates in the wireless communication system, in which in a period during which the first and second frequency channels are not simultaneously used by at least one wireless terminal station belonging to the first group or the wireless base station, direct communication is performed between wireless terminal stations in the second frequency channel without through the wireless base station.

According to the wireless communication method described in (25), in a 20 MHz period, a legacy terminal and a base station communicate with each other in one 20 MHz bandwidth, and high throughput terminals perform direct communication in the other 20 MHz bandwidth, thereby effectively using frequency channels.

(26) A wireless communication method according to an embodiment of the present invention is the wireless communication method described in any one of (1) to (22), in which the combination of the first and second communication periods is periodically repeated.

According to the wireless communication method described in (26), periodical repetition of a 40 MHz communication period and 20 MHz communication period is suitable for the transmission of real time data.

(27) A wireless communication according to an embodiment of the present invention is the wireless communication method described in (23), in which the duration of the first communication period is contained in a notification information frame transmitted by the wireless base station.

According to the wireless communication method described in (27), the base station changes the length of a 40-MHz communication period by using a beacon according to the situation, thereby realizing adaptive control.

(28) A wireless communication method according to an embodiment of the present invention is the wireless communication method described in any one of (1) to (22), in which the second communication period is started after a transmission right is obtained on the basis of carrier sense in the first and second frequency channels in the first communication period.

According to the wireless communication method described in (28), only when 40 MHz communication needs to be performed, a 40 MHz communication period is acquired by carrier sense, thereby efficiently using frequency channels.

(29) A wireless communication method according to an embodiment of the present invention is the wireless communication method described in any one of (1) to (25), the first communication period is a period in which the first and second frequency channels are not simultaneously used by at least one wireless terminal station belonging to the first group or the wireless base station, and the second communication period is a period in which the first and second frequency channels are simultaneously used by at least one wireless terminal station belonging to the first group or the wireless base station.

According to the wireless communication method described in (29), the first communication period is a communication period in which the 40 MHz bandwidth is used, and the second communication period is a communication period in which the 20 MHz bandwidth is used.

(30) A wireless communication method according to an embodiment of the present invention is the wireless communication method described in any one of (1) to (26), in which a wireless terminal station belonging to the first group simultaneously uses the first and second frequency channels, and switches and uses the first and second frequency channels regardless of an instruction from the wireless base station.

In the wireless communication method described in (30), a wireless terminal station belonging to the first group is a high throughput terminal, and a wireless terminal station belonging to the second group is a legacy terminal.

(31) A wireless communication system according to an embodiment of the present invention is a wireless communication system in which two different frequency channels are shared, wherein in a period in which the first and second frequency channels are not simultaneously used by at least one wireless terminal station or a wireless base station, at least two wireless terminal stations perform direct communication in the second frequency channel without through the wireless base station, and at least one wireless terminal station or the wireless base station performs communication in the first frequency channel.

According to the wireless communication system described above, in a 20 MHz period, a legacy terminal and a base station communicate with each other in one 20 MHz bandwidth, and high throughput terminals perform direct communication in the other 20 MHz bandwidth, thereby realizing a wireless communication system which effectively uses frequency bandwidths.

BRIEF DESCRIPTION OF THE SEVERAL VIEWS OF THE DRAWING

FIG. 8 is a flowchart showing an example of processing operation by a wireless terminal station 2;

FIG. 12 is a flowchart showing an example of processing operation by a wireless terminal station 2a;

FIG. 16 is a view showing the sixth example of the packet transmission/reception timing according to embodiments of the present invention;

FIG. 17 is a view showing the seventh example of the packet transmission/reception timing according to embodiments of the present invention;

FIG. 18 is a flowchart showing an example of processing operation by a wireless terminal station 2a;

FIG. 20 is a flowchart showing an example of processing operation by a wireless terminal station 2a;

FIG. 21 is a view showing an example of the constituent elements of a packet containing information indicating a direct communication request which a wireless terminal station 2a transmits to a wireless terminal station 2b;

FIG. 22 is a view showing the ninth example of the packet transmission/reception timing according to embodiments of the present invention;

FIG. 23 is a view showing the 10th example of the packet transmission/reception timing according to embodiments of the present invention;

FIG. 24 is a view showing the 11th example of the packet transmission/reception timing according to embodiments of the present invention;

DETAILED DESCRIPTION OF THE INVENTION

The embodiments of the present invention will be described below with reference to the views of the accompanying drawing.

FIRST EMBODIMENT

Figure 1:
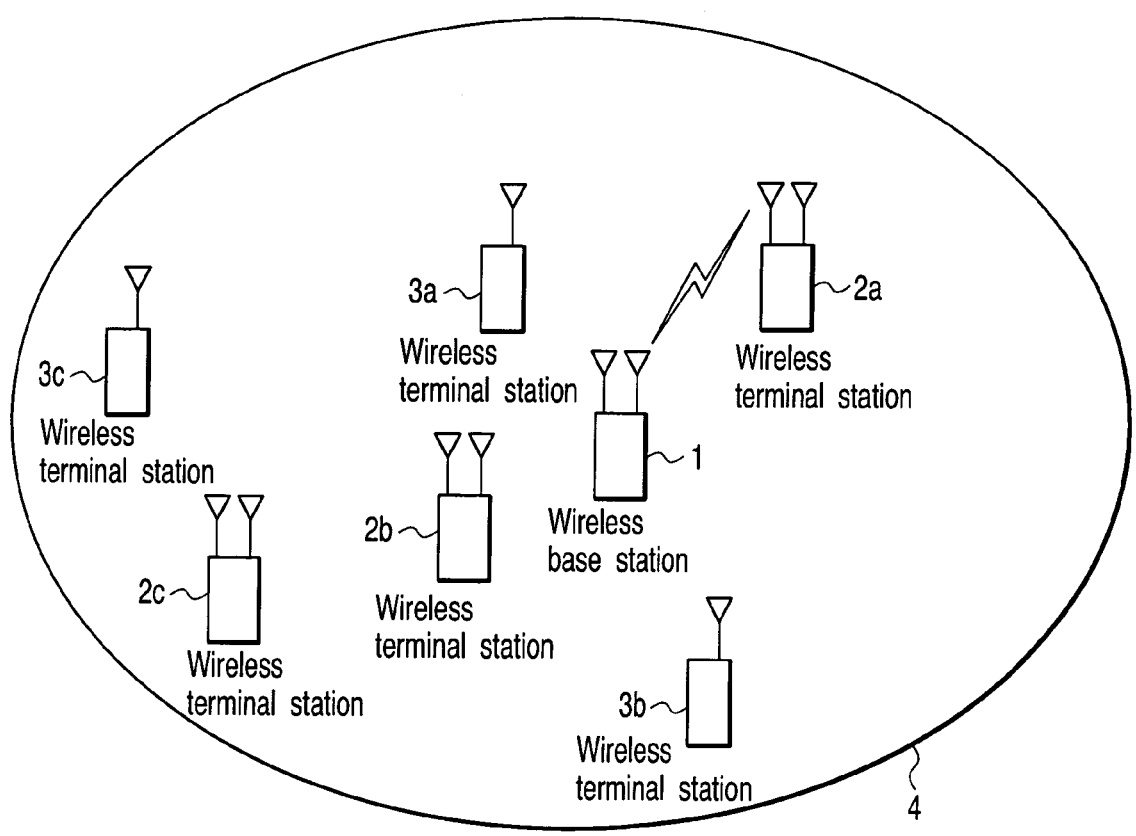
FIG. 1 is a block diagram showing an example of the schematic arrangement of a wireless network system including a wireless base station 1 and a plurality of wireless terminal stations according to embodiments of the present invention.

FIG. 1 is a block diagram showing a wireless communication system according to an embodiment of the present invention. A wireless communication system 4 comprises a wireless base station 1, wireless terminal stations 2a, 2b, and 2c belonging to the first group, and wireless terminal stations 3a, 3b, and 3c belonging to the second group. FIG. 1 shows the three wireless terminal stations 2 belonging to the first group and the three wireless terminal stations 3 belonging to the second group. However, the numbers of wireless terminal stations 2 and wireless terminal stations 3 are not specifically limited.

The wireless base station 1 allows the wireless terminal station 2 belonging to the first group and the wireless terminal station 3 belonging to the second group to perform wireless communication between them while sharing two different frequency channels. In the wireless communication system 4, one of the wireless terminal stations 2 belonging to the first group and one of the wireless terminal stations 3 belonging to the second group can directly perform wireless communication without through the wireless base station 1.

Figure 2A:
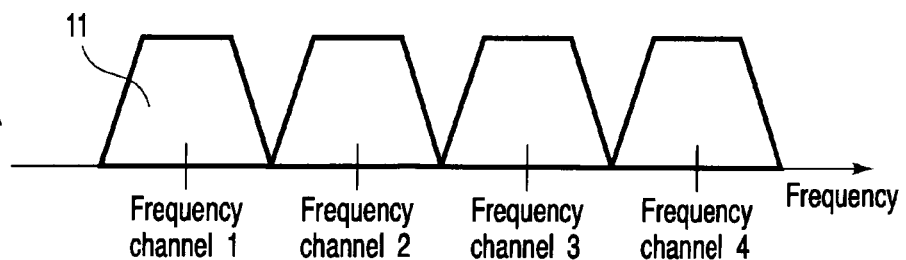
FIGS. 2A to 2D are views each showing an example of the schematic arrangement of frequency channels according to embodiments of the present invention.
Figure 2B:
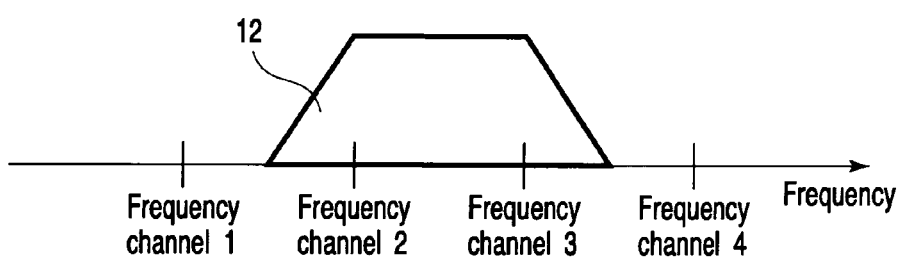
Figure 2C:
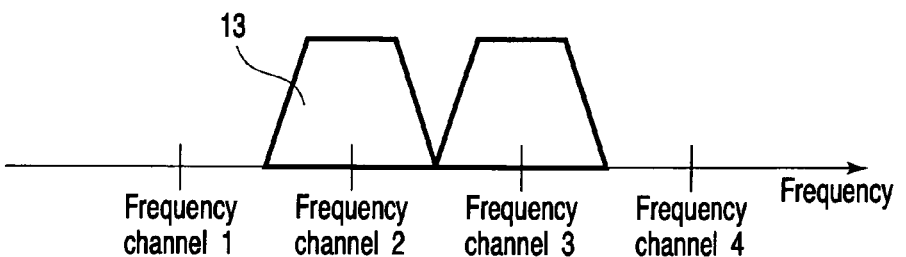
Figure 2D:
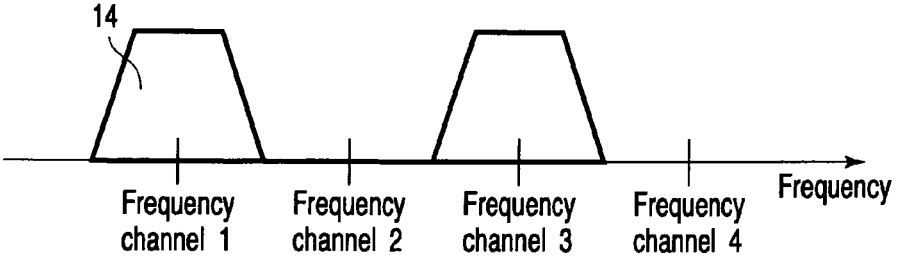

Each of FIGS. 2A to 2D is a block diagram showing an example of the schematic arrangement of frequency channels in this embodiment and, more specifically, an example of a four-channel arrangement including frequency channels 1 to 4. A bandwidth 11 in FIG. 2A is a bandwidth corresponding to one frequency channel. The two different frequency channels shared by the wireless communication system 4 in FIG. 1 may be a bandwidth 12 obtained by making two adjacent frequency channels continuous as shown in FIG. 2B, or a discontinuous bandwidth 13 including two adjacent frequency channels as shown in FIG. 2C, or a discontinuous bandwidth 14 including two frequency channels which are not adjacent to each other as shown in FIG. 2D.

Assume that in the following embodiment, the bandwidth (11) corresponding to one frequency channel shown in FIG. 2A is a 20 MHz bandwidth, i.e., the two different frequency channels shared by the wireless communication system 4 in FIG. 1 constitute a 40 MHz bandwidth.

In this case, the wireless base station 1 and the wireless terminal station 2 belonging to the first group are high-throughput terminals which can perform high-throughput wireless communication by using the 40-MHz bandwidth. Note that a high-throughput terminal can also perform wireless communication using only one 20-MHz bandwidth. In this case, the wireless terminal station 3 belonging to the second group is a legacy terminal which can use only one 20-MHz bandwidth but cannot perform communication using the 40-MHz bandwidth.

Figure 3:
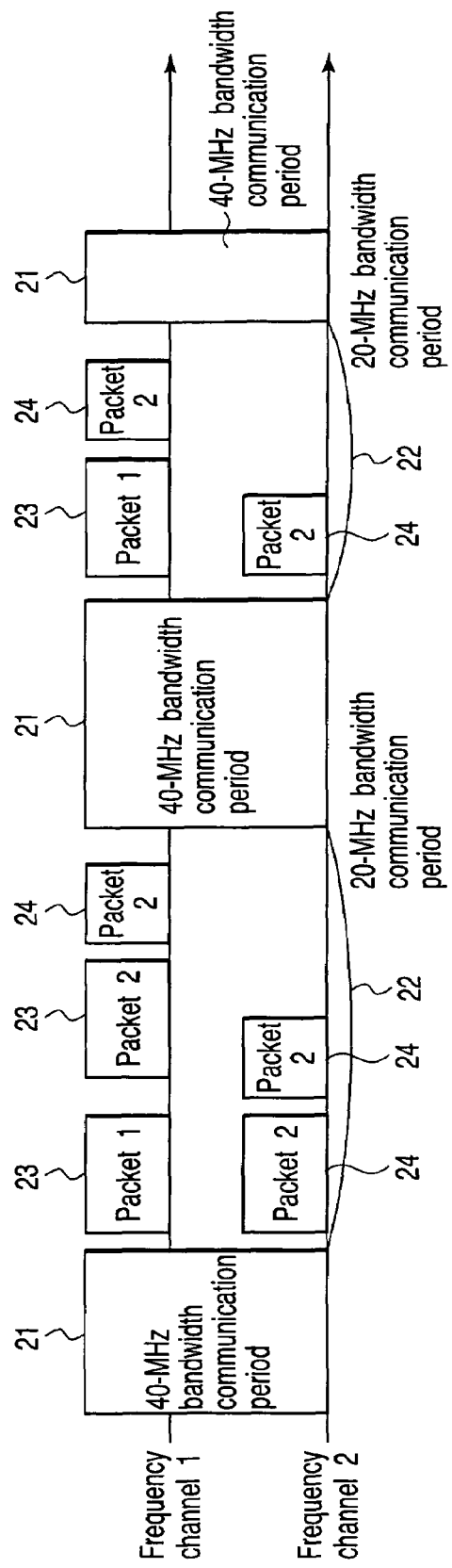
FIG. 3 is a view showing the first example of the packet transmission/reception timing according to embodiments of the present invention.

FIG. 3 is a view showing the first example of a packet transmission/reception timing in this embodiment. FIG. 3 shows a case wherein a communication period 21 in which the 40-MHz bandwidth is used and a communication period 22 in which the 20-MHz bandwidth is used are alternately repeated. Referring to FIG. 3, reference numeral 23 denotes a packet transmitted by the wireless base station 1 in FIG. 1; and 24, a packet transmitted by the wireless terminal station 2 belonging to the first group or the wireless terminal station 3 belonging to the second group. As shown in FIG. 3, in the communication period in which the 20-MHz bandwidth is used, the wireless base station 1 and the wireless terminal station 2 or 3 exchange packets in frequency channel 1, and the wireless terminal stations 2 or 3 directly communicate with each other (DLP:Direct Link Protocol) without through the wireless base station 1. Referring to FIG. 3, packets associated with direct communication (DLP: direct link protocol) are packets 2(24) in the communication period 22 in which the 20-MHz bandwidth is used. FIG. 3 shows three such packets. Note that in the communication period 22 in which the 20-MHz bandwidth is used, while the wireless base station 1 is using frequency channel 2, direct communication is performed by using frequency channel 1.

Figure 4:
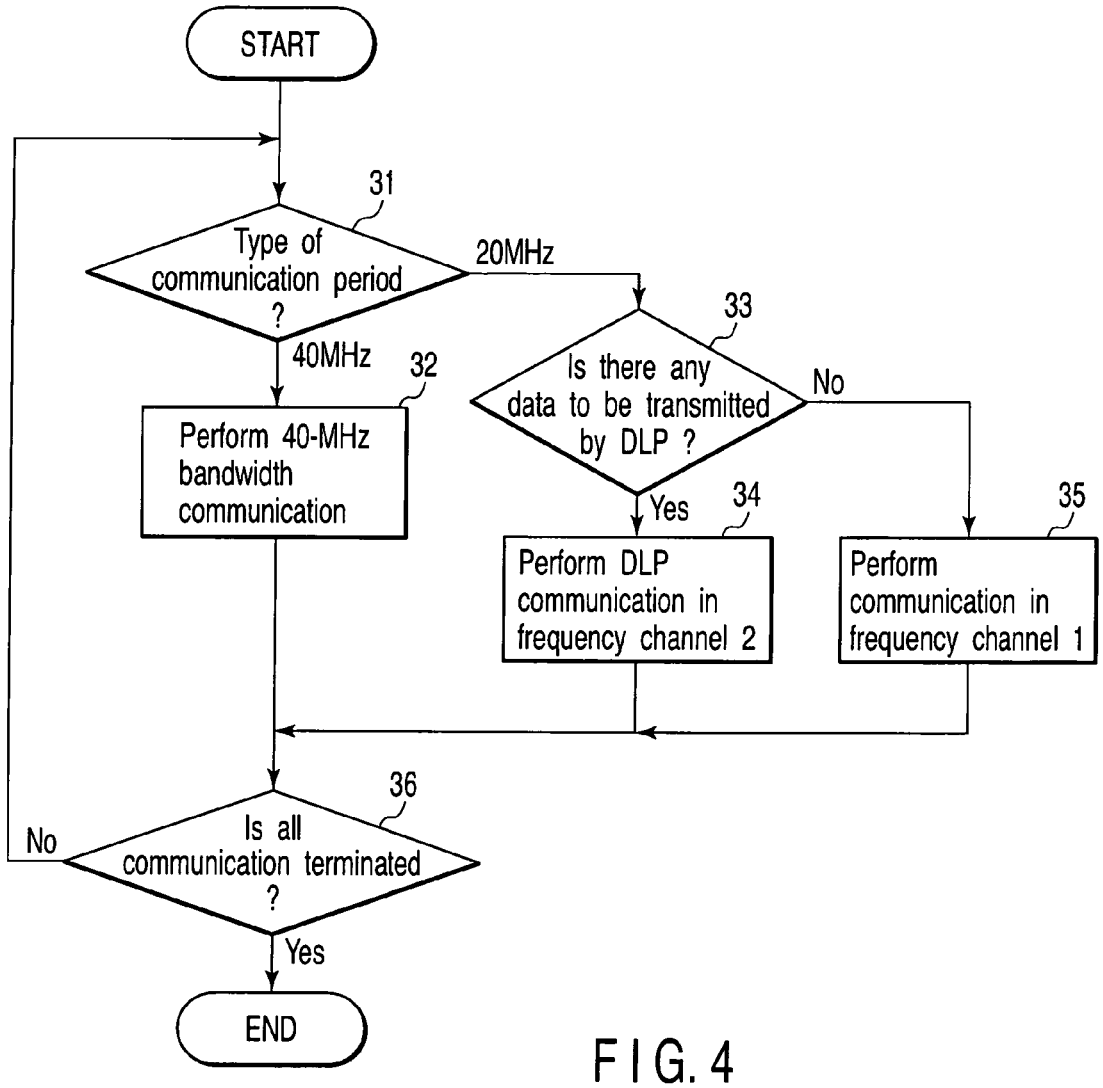
FIG. 4 is a flowchart showing an example of processing operation by a wireless terminal station 2 or 3.

FIG. 4 is a flowchart showing an example of the processing operation by the wireless terminal station 2 or wireless terminal station 3. The flowchart of FIG. 4 shows processing to be performed after authentication processing to be performed between the wireless terminal station 2 or wireless terminal station 3 and the wireless base station 1 to transmit data, registration processing for the wireless base station 1, the registration processing of the type of data to be transmitted, and the like. The wireless terminal station 2 or 3 discriminates whether the current period is a communication period in which the 20-MHz bandwidth is used or a communication period in which the 40-MHz bandwidth is used (step 31). If the communication period in which the 40-MHz bandwidth is used is discriminated, communication using the 40-MHz bandwidth is performed (step 32). If it is discriminated in step 31 that the current period is a period in which the 20-MHz bandwidth is used, it is determined whether there is any data to be transmitted by DLP (step 33). If there is data to be transmitted by DLP, communication is performed by DLP in frequency channel 2 (step 34). If there is no data to be transmitted by DLP, non-DLP communication is performed in frequency channel 1 (step 35). It is then determined whether or not all the communication is terminated (step 36). If all the communication is to be terminated, the communication is terminated. If the communication is to be continued, the processing in step 31 and the subsequent steps is repeated.

In this manner, in a communication period in which the 20-MHz bandwidth is used, the wireless base station 1 and the wireless terminal station 2 or 3 communicate with each other in one frequency channel 1, and the wireless terminal stations 2 or 3 directly communicate with each other in the other frequency channel 2 without through the wireless base station 1, thereby effectively using the frequency resources. This can therefore improve the overall data transmission efficiency of the wireless communication system.

SECOND EMBODIMENT

Figure 5:
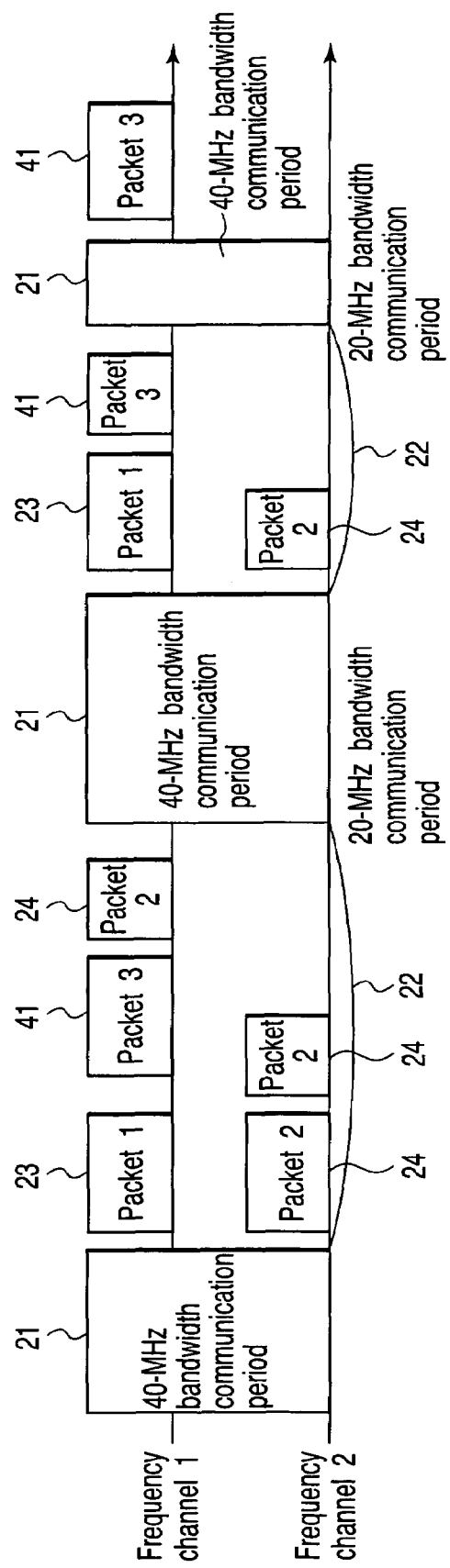
FIG. 5 is a view showing the second example of the packet transmission/reception timing according to embodiments of the present invention.

FIG. 5 is a view showing the second example of the packet transmission/reception timing in this embodiment. Referring to FIG. 5, reference numeral 21 denotes a communication period in which the 40-MHz bandwidth is used; 22, a communication period in which the 20-MHz bandwidth is used; 23, a packet transmitted by a wireless base station 1 in FIG. 1; 24, a packet transmitted by a wireless terminal station 2 belonging to the first group in FIG. 1; and 41, a packet transmitted by a wireless terminal station 3 belonging to the second group. Assume that in this case, the wireless terminal station 2 belonging to the first group in FIG. 1 can perform communication using the 40-MHz bandwidth and freely switch the frequency channels shown in FIGS. 2A to 2D without any instruction from the wireless base station 1. Assume that the wireless terminal station 3 belonging to the second group in FIG. 1 can perform only communication using the 20-MHz bandwidth and can switch frequency channels in accordance with an instruction from the wireless base station 1 or wireless terminal station 2.

As shown in FIG. 5, in a communication period in which the 20-MHz bandwidth is used, the wireless base station 1 and the wireless terminal station 2 or 3 exchange packets in frequency channel 1, and the wireless terminal stations 2, which can freely switch frequency channels, perform direct communication (DLP) in frequency channel 2 without through the wireless base station 1. Note that in a communication period in which the 20-MHz bandwidth is used, it is not necessary for all the wireless terminal stations 2 belonging to the first group in FIG. 1 to perform communication by DLP, and it suffices if only the wireless terminal stations 2 which need to perform communication by DLP perform communication by DLP in frequency channel 2.

Figure 6:
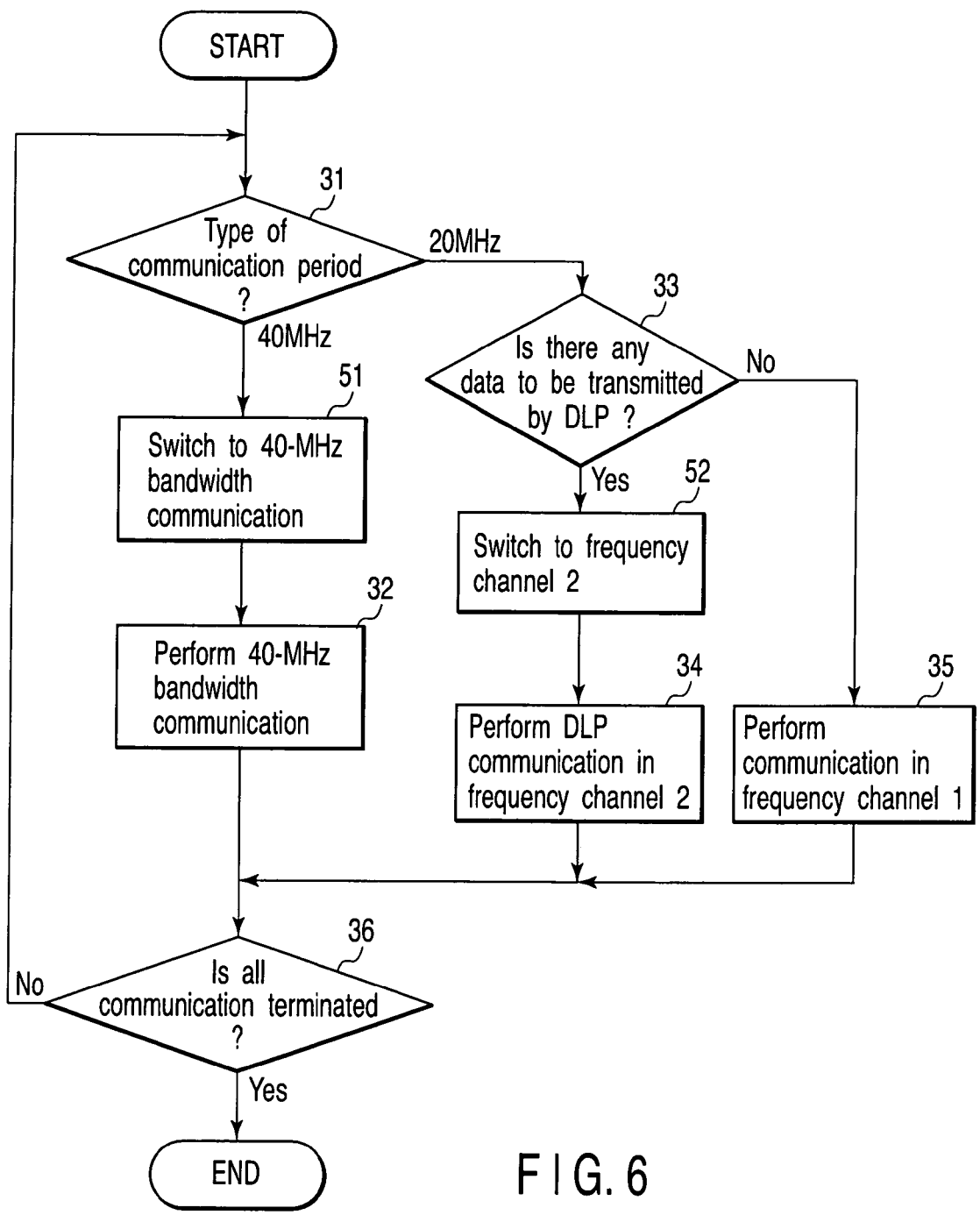
FIG. 6 is a flowchart showing an example of processing operation by a wireless terminal station 2.

FIG. 6 is a flowchart showing an example of processing operation by the wireless terminal station 2. The flowchart of FIG. 6 shows processing after the wireless terminal station 2 completes authentication processing with the wireless base station 1 for the transmission of data, registration processing for the wireless base station 1, registration processing of the type of data to be transmitted, and the like. The wireless terminal station 2 discriminates whether the current period is a communication period in which the 20-MHz bandwidth is used or a communication period in which the 40-MHz bandwidth is used (step 31). If the current period is a communication period in which the 40-MHz bandwidth is used, the wireless terminal station 2 switches frequency channels (step 51) and performs communication using the 40-MHz bandwidth (step 32). If it is discriminated in step 31 that the current period is a communication period in which the 20-MHz bandwidth is used, the wireless terminal station 2 determines whether there is any data to be transmitted by DLP (step 33). If there is data to be transmitted by DLP, the wireless terminal station 2 switches frequency channels (step 52) and performs communication by DLP in frequency channel 2 (step 34). If there is no data to be transmitted by DLP, the wireless terminal station 2 performs or non-DLP communication in frequency channel 1 (step 35). It is then determined whether or not all the communication is terminated (step 36). If it is determined that all the communication is to be terminated, the communication is terminated. If the communication is to be continued, the processing in step 31 and the subsequent steps is repeated.

In this manner, in a communication period in which the 20-MHz bandwidth is used, the wireless base station 1 and the wireless terminal station 2 or 3 communicate with each other in one frequency channel 1, and the wireless terminal stations 2 directly communicate with each other in the other frequency channel 2 without through the wireless base station 1, thereby effectively using the frequency resources.

According to the above description, only the wireless terminal stations 2 belonging to the first group perform direct communication in frequency channel 2. However, the wireless terminal stations 3 belonging to the second group may perform direct communication in frequency channel 2. This can be realized by giving the wireless terminal station 2 the right to instruct frequency channel switching and making the wireless base station 1 or wireless terminal station 2 issue an instruction to switch frequency channels to the wireless terminal station 3 belonging to the second group.

In this manner, by allowing not only the wireless terminal stations 2 belonging to the first group but also the wireless terminal stations 3 belonging to the second group to perform direct communication in frequency channel 2, the frequency channels can be effectively used.

In addition, providing a data buffer function for the wireless base station 1 makes it possible to perform packet exchange more efficiently. When the wireless base station 1 receives a packet addressed to a wireless terminal station 2*a* or 2*b* in frequency channel 1 while the wireless terminal stations 2*a* and 2*b* are directly communicating with each other in frequency channel 2, the wireless base station 1 buffers the received packet and transfers it to the wireless terminal station 2*a* or 2*b* after the direct communication between them is terminated.

Making the wireless base station 1 buffer a packet addressed to a wireless terminal station which is performing direct communication, in this manner, can perform packet exchange more efficiently.

In addition, control on the transmission rate of packets to be transmitted may be combined with the above direct communication in frequency channel 2. When frequency channels 1 and 2 are adjacent frequency channels as shown in FIG. 2C, the packet reception success probability decreases due to interference from each of the adjacent frequency channels. In a period in which two frequency channels are simultaneously used, an increase in packet reception error rate can be suppressed and efficient packet exchange can be realized by transmitting packets at a transmission rate at which a decrease in packet reception success probability due to interference is small.

In addition, beam control using a plurality of antennas may be combined with the above direct communication in the frequency channel. In this case as well, if frequency channels 1 and 2 are adjacent frequency channels, the packet reception success probability decreases due to interference from each of the adjacent frequency channels. In a period in which the two frequency channels are simultaneously used, beam control using a plurality of antennas is performed to increase the packet reception success probability at the wireless terminal station to which packets are addressed, thereby suppressing an increase in packet reception error rate and realizing efficient packet exchange.

THIRD EMBODIMENT

Figure 7:
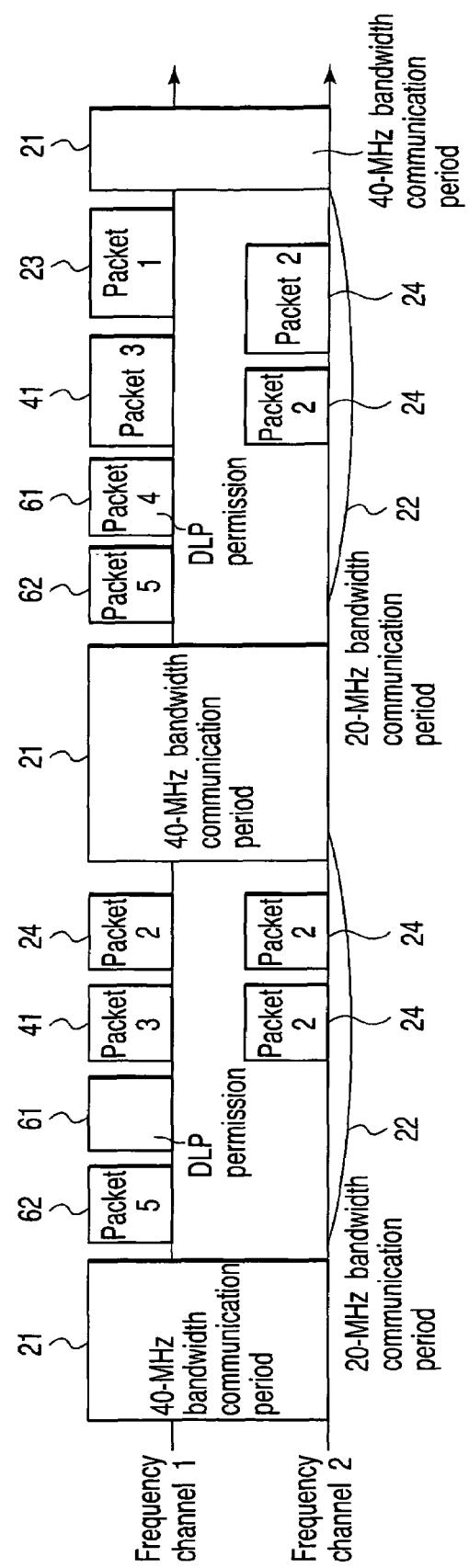
FIG. 7 is a view showing the third example of the packet transmission/reception timing according to embodiments of the present invention.

FIG. 7 is a view showing the third example of the packet transmission/reception timing in this embodiment. Referring to FIG. 7, reference numeral 21 denotes a communication period in which the 40-MHz bandwidth is used; 22, a communication period in which the 20-MHz bandwidth is used; 23, a packet transmitted by a wireless base station 1 in FIG. 1; 24, a packet transmitted by a wireless terminal station 2 belonging to the first group in FIG. 1; 41, a packet transmitted by a wireless terminal station 3 belonging to the second group; 61, a packet containing information indicating the permission of direct communication which the wireless base station 1 transmits; and 62, a packet transmitted before the wireless base station 1 transmits a packet containing information indicating the permission of direct communication in a communication period in which the 20-MHz bandwidth is used. Assume that in this case, as in the second embodiment, the wireless terminal station 2 belonging to the first group in FIG. 1 can perform communication using the 40-MHz bandwidth and freely switch frequency channels shown in FIGS. 2A to 2D without any instruction from the wireless base station 1. Assume also that the wireless terminal station 3 belonging to the second group in FIG. 1 can perform only communication using the 20-MHz bandwidth and switch frequency channels in accordance with an instruction from the wireless base station 1 or wireless terminal station 2.

In the case shown in FIG. 7, in a communication period in which the 20-MHz bandwidth is used, since, for example, data to be transmitted from the wireless base station 1 to the wireless terminal station 2 is left, the wireless base station 1 transmits a packet 5(62) to the wireless terminal station 2. Upon completing the transmission of data to the wireless terminal station 2, the wireless base station 1 transmits a packet 4(61) containing information indicating the permission of communication by DLP. After the packet 4(61) is transmitted by the wireless base station 1, the wireless terminal stations 2 which can freely switch frequency channels in frequency channel 2 performs direct communication (DLP) without through the wireless base station 1. In frequency channel 1, the wireless terminal station 2 or 3, which does not perform DLP communication in frequency channel 2, exchanges packets with the wireless base station 1.

FIG. 8 is a flowchart showing an example of processing operation by the wireless terminal station 2. The flowchart of FIG. 8 shows processing after the wireless terminal station 2 completes authentication processing with the wireless base station 1 for the transmission of data, registration processing for the wireless base station 1, registration processing of the type of data to be transmitted, and the like. The wireless terminal station 2 discriminates whether the current period is a communication period in which the 20-MHz bandwidth is used or a communication period in which the 40-MHz bandwidth is used (step 31). If the current period is a communication period in which the 40-MHz bandwidth is used, the wireless terminal station 2 switches frequency channels (step 51) and performs communication using the 40-MHz bandwidth (step 32). If it is determined in step 31 that the current period is a communication period in which the 20-MHz bandwidth is used, it is determined whether there is any data to be transmitted by DLP (step 33). If there is data to be transmitted by DLP, it is determined whether or not information indicating the permission of DLP communication has been received (step 71). If DLP is not permitted, the wireless terminal station 2 performs successful communication using frequency channel 1 (step 72). If DLP is permitted, the wireless terminal station 2 switches the frequency channel to frequency channel 2 (step 52) and performs communication by DLP in frequency channel 2 (step 34). If it is determined in step 33 that there is no data to be transmitted by DLP, the wireless terminal station 2 performs non-DLP communication using frequency channel 1 (step 35). Subsequently, it is determined whether or not all the communication is terminated (step 36). If all the communication is to be terminated, the communication is terminated. If the communication is to be continued, the processing in step 31 and the subsequent steps is repeated.

The above embodiment has exemplified the case wherein the wireless base station 1 transmits a packet containing information indicating the permission of direct communication in a communication period in which the 20-MHz bandwidth is used. However, the packet containing information indicating the permission of direct communication need not always be transmitted in a communication period in which the 20-MHz bandwidth is used, and may be transmitted in a communication period in which the 40-MHz bandwidth is used.

In this manner, in a communication period in which the 20-MHz bandwidth is used, the wireless base station 1 and the wireless terminal station 2 or 3 communicate with each other in one frequency channel 1, and the wireless terminal stations 2 directly communicate with each other in the other frequency channel 2 without through the wireless base station 1 upon acquisition of a permission from the wireless base station 1, thereby effectively using the frequency resources while improving the data transmission/reception efficiency.

According to the above description, the wireless terminal stations 2 belonging to the first group perform direct communication in frequency channel 2 upon acquisition of a permission from the wireless base station 1. However, the wireless base station 1 may transmit a packet notifying a frequency channel as a base for each wireless terminal station 2, instead of packet indicating the permission of direct communication, so as to allow each wireless terminal station 2 to perform direct communication upon switching frequency channels in accordance with the notification information. Information associated with a frequency channel as a base for each wireless terminal station 2 can be generated by the wireless base station 1 when the wireless terminal station 2 notifies the wireless base station 1 of the information at the time of execution of registration processing for the wireless base station 1.

FOURTH EMBODIMENT

Figure 9:
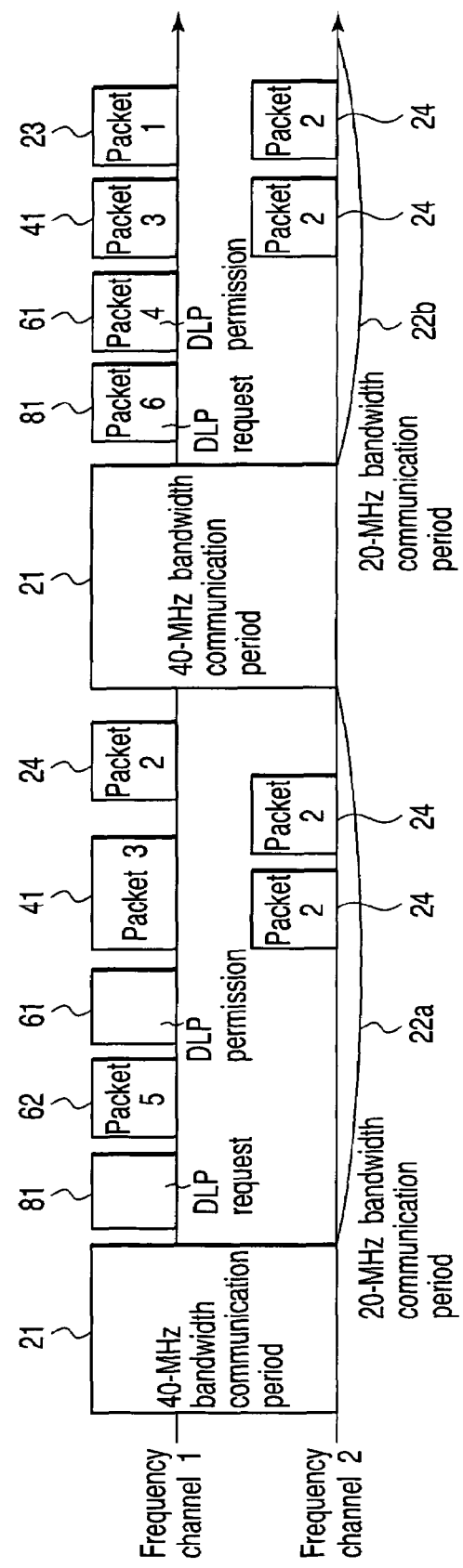
FIG. 9 is a view showing the fourth example of the packet transmission/reception timing according to embodiments of the present invention.

FIG. 9 is a view showing the fourth example of the packet transmission/reception timing in this embodiment. Referring to FIG. 9, reference numeral 21 denotes a communication period in which the 40-MHz bandwidth is used; 22, a communication period in which the 20-MHz bandwidth is used; 23, a packet transmitted by a wireless base station 1 in FIG. 1; 24, a packet transmitted by a wireless terminal station 2 belonging to the first group in FIG. 1; 41, a packet transmitted by a wireless terminal station 3 belonging to the second group in FIG. 1; 61, a packet containing information indicating the permission of direct communication which the wireless base station 1 transmits and; 62, a packet transmitted before the wireless base station 1 transmits a packet containing information indicating the permission of direct communication in a communication period in which the 20-MHz bandwidth is used; and 81, a packet containing information requesting direct communication which the wireless terminal station 2 belonging to the first group transmits in FIG. 1. Assume that in this case, as in the second embodiment, the wireless terminal station 2 belonging to the first group in FIG. 1 can perform communication using the 40-MHz bandwidth and freely switch the frequency channels shown in FIGS. 2A to 2D without any instruction from the wireless base station 1. Assume also that the wireless terminal station 3 belonging to the second group in FIG. 1 can perform only communication using the 20-MHz bandwidth and switch frequency channels in accordance with an instruction from the wireless base station 1 or wireless terminal station 2.

In the case shown in FIG. 9, since the wireless terminal station 2 belonging to the first group has a data transmission request addressed to the wireless terminal station 2 belonging to the same first group, the wireless terminal station 2 transmits a packet 6(81) containing information indicating a direct communication request to the wireless base station 1 in a communication period 22a in which the 20-MHz bandwidth is used. The wireless base station 1 holds data addressed to the wireless terminal station 2 which requests direct communication, and hence transmits a packet 5(62) to the wireless terminal station 2 before transmitting a packet containing information indicating the permission of direct communication. Upon transmitting the packet 5, the wireless base station 1 transmits a packet 4(61) containing information indicating the permission of communication by DLP. After the packet 4(61) is transmitted by the wireless base station 1, the wireless terminal station 2 which can freely switch frequency channels performs direct communication (DLP) with another wireless terminal station in frequency channel 2 without through the wireless base station 1. In frequency channel 1, the wireless base station 1 exchanges packets with the wireless terminal station 2 or 3 which does not perform DLP communication in frequency channel 2. In a communication period 22b in which the 20-MHz bandwidth is used, the wireless terminal station 2 transmits the packet 6(81) containing information indicating a direct communication request to the wireless base station 1. Since the wireless base station 1 holds no data addressed to the wireless terminal station 2 which is requesting direct communication, the wireless base station 1 immediately transmits the packet 4(61) containing information indicating the permission of communication by DLP.

Figure 10:
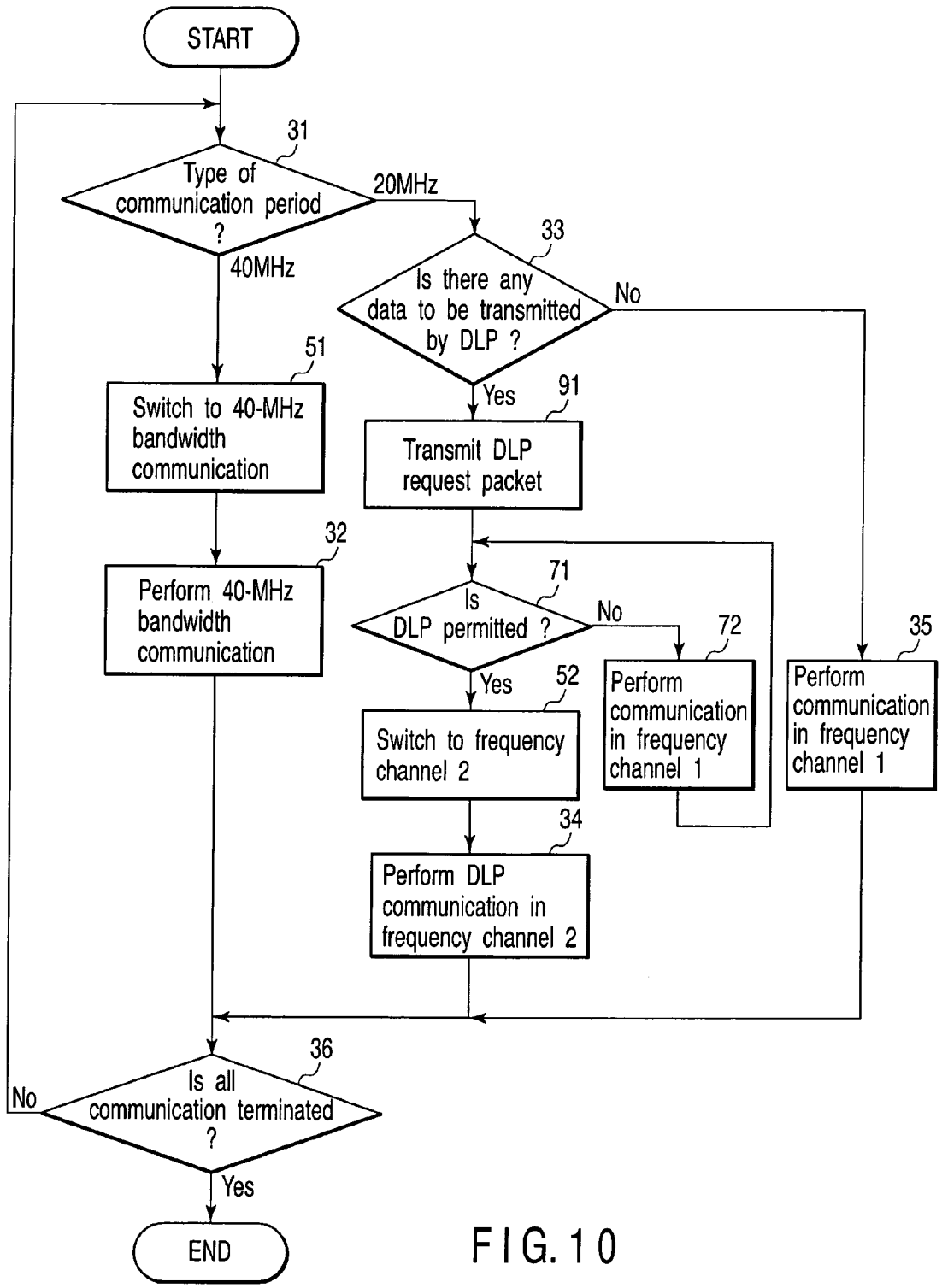
FIG. 10 is a flowchart showing an example of processing operation by a wireless terminal station 2.

FIG. 10 is a flowchart showing an example of processing operation by the wireless terminal station 2. The flowchart of FIG. 10 shows processing after the wireless terminal station 2 completes authentication processing with the wireless base station 1 for the transmission of data, registration processing for the wireless base station 1, registration processing of the type of data to be transmitted, and the like. The wireless terminal station 2 discriminates whether the current period is a communication period in which the 20-MHz bandwidth is used or a communication period in which the 40-MHz bandwidth is used (step 31). If the current period is a communication period in which the 40-MHz bandwidth is used, the wireless terminal station 2 switches frequency channels (step 51) and performs communication using the 40-MHz bandwidth (step 32). If it is determined in step 31 that the current period is a communication period in which the 20-MHz bandwidth is used, it is determined whether there is any data to be transmitted by DLP (step 33). If there is data to be transmitted by DLP, a packet containing information indicating a DLP request is transmitted (step 91), and then it is determined whether or not information indicating the permission of DLP communication has been received (step 71). If DLP is not permitted, the wireless terminal station 2 performs non-DLP communication using frequency channel 1 (step 72). If DLP is permitted, the wireless terminal station 2 switches the frequency channel to frequency channel 2 (step 52) and performs communication by DLP in frequency channel 2 (step 34). If it is determined in step 33 that there is no data to be transmitted by DLP, the wireless terminal station 2 performs non-DLP communication using frequency channel 1 (step 35). Subsequently, it is determined whether or not all the communication is terminated (step 36). If all the communication is to be terminated, the communication is terminated. If the communication is to be continued, the processing in step 31 and the subsequent steps is repeated.

The above embodiment has exemplified the case wherein the wireless terminal station 2 transmits a packet containing information indicating a direct communication request in a communication period in which the 20-MHz bandwidth is used. However, a packet containing information indicating a direct communication request need not always be transmitted in a communication period in which the 20-MHz bandwidth is used, and may be transmitted in a communication period in which the 40-MHz bandwidth is used. A packet containing information indicating the permission of direct communication which is to be transmitted by the wireless base station 1 need not always be transmitted in a communication period in which the 20-MHz bandwidth is used, and may be transmitted in a communication period in which the 40-MHz bandwidth is used.

Transmitting a frame containing information indicating a DLP request to the wireless base station 1 in this manner only when the wireless terminal station 2 needs to perform communication by DLP makes it possible to effectively use the frequency resources while improving the data transmission/reception efficiency.

FIFTH EMBODIMENT

Figure 11:
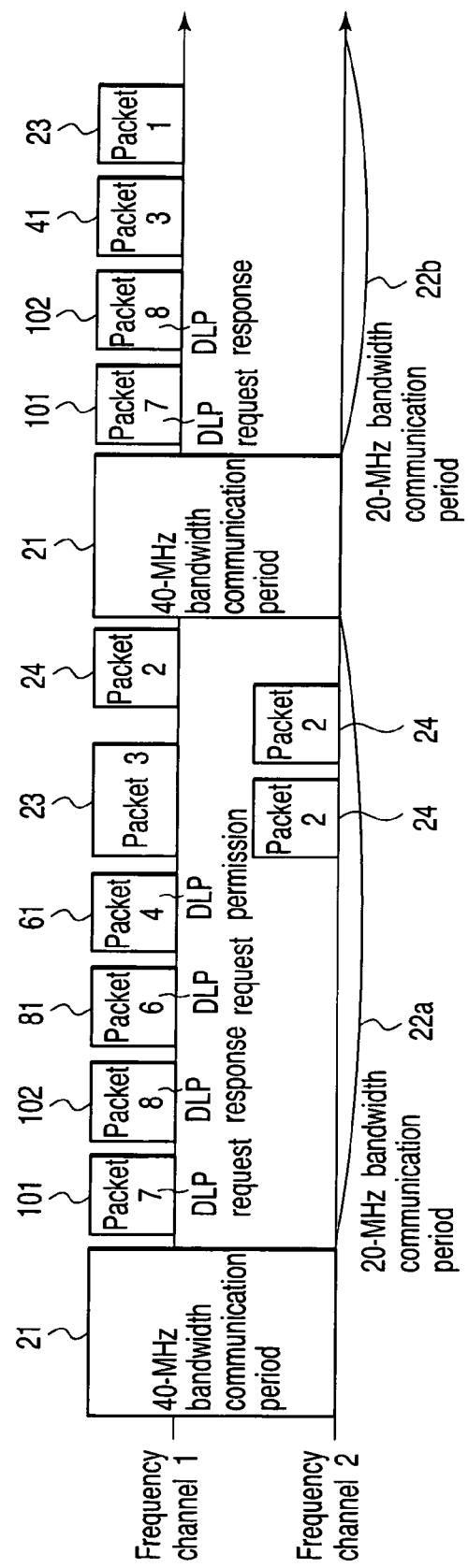
FIG. 11 is a view showing the fifth example of the packet transmission/reception timing according to embodiments of the present invention.

FIG. 11 is a view showing the fifth example of the packet transmission/reception timing in this embodiment. Referring to FIG. 11, reference numeral 21 denotes a communication period in which the 40-MHz bandwidth is used; 22, a communication period in which the 20-MHz bandwidth is used; 23, a packet transmitted by a wireless base station 1 in FIG. 1; 24, a packet transmitted by a wireless terminal station 2 belonging to the first group in FIG. 1; 41, a packet transmitted by a wireless terminal station 3 belonging to the second group in FIG. 1; 61, a packet containing information indicating the permission of direct communication which the wireless base station 1 transmits; 62, a packet transmitted before the wireless base station 1 transmits a packet containing information indicating the permission of direct communication in a communication period in which the 20-MHz bandwidth is used; 81, a packet containing information requesting direct communication which the wireless terminal station 2 belonging to the first group transmits to the wireless base station 1; 101, a packet which a wireless terminal station 2a belonging to the first group transmits to a wireless terminal station 2b belonging to the first group and contains information indicating a direct communication request; and 102, a packet containing information indicating whether or not the wireless terminal station 2b which belongs to the first group and is requested to perform direct communication accepts direct communication. Assume that in this case, as in the second embodiment, the wireless terminal station 2 belonging to the first group in FIG. 1 can perform communication using the 40-MHz bandwidth and freely switch the frequency channels shown in FIGS. 2A to 2D without any instruction from the wireless base station 1. Assume also that the wireless terminal station 3 belonging to the second group in FIG. 1 can perform only communication using the 20-MHz bandwidth and switch frequency channels in accordance with an instruction from the wireless base station 1 or wireless terminal station 2.

In the case shown in FIG. 11, since the wireless terminal station 2a belonging to the first group has a data transmission request addressed to the wireless terminal station 2b belonging to the same first group, the wireless terminal station 2a transmits a packet 7(101) containing information indicating a direct communication request to the wireless terminal station 2b in a communication period 22a in which the 20-MHz bandwidth is used. Upon receiving the direct communication request from the wireless terminal station 2a, the wireless terminal station 2b determines whether or not to accept direct communication, and transmits, to the wireless terminal station 2a, a packet 8(102) containing information indicating whether or not to accept direct communication. Upon receiving a packet containing information indicating the acceptance of direct communication from the wireless terminal station 2b, the wireless terminal station 2a transmits a packet 6(81) containing information indicating a direct communication request to a wireless base station 1. Upon receiving the direct communication request from the wireless terminal station 2a, the wireless base station 1 determines whether or not to permit direct communication, and transmits a packet 4(61) containing information indicating the permission of direct communication when permitting direct communication. After the packet 4(61) is transmitted by the wireless base station 1, the wireless terminal station 2 which can freely switch frequency channels perform direct communication (DLP) with another wireless terminal station in frequency channel 2 without through the wireless base station 1. In frequency channel 1, the wireless base station 1 exchanges packets with the wireless terminal station 2 or 3 which does not perform DLP communication in frequency channel 2. In communication period 22b in which the 20-MHz bandwidth is used, the wireless terminal station 2a transmits a packet 7(101) containing information indicating a direct communication request to the wireless terminal station 2b. However, the wireless terminal station 2b determines to reject direct communication, and transmits a packet 8(102) containing information indicating the rejection of direct communication. Therefore, the wireless terminal station 2a does not transmit the packet 6(81) containing information indicating a direct communication request to the wireless base station 1.

Figure 12:
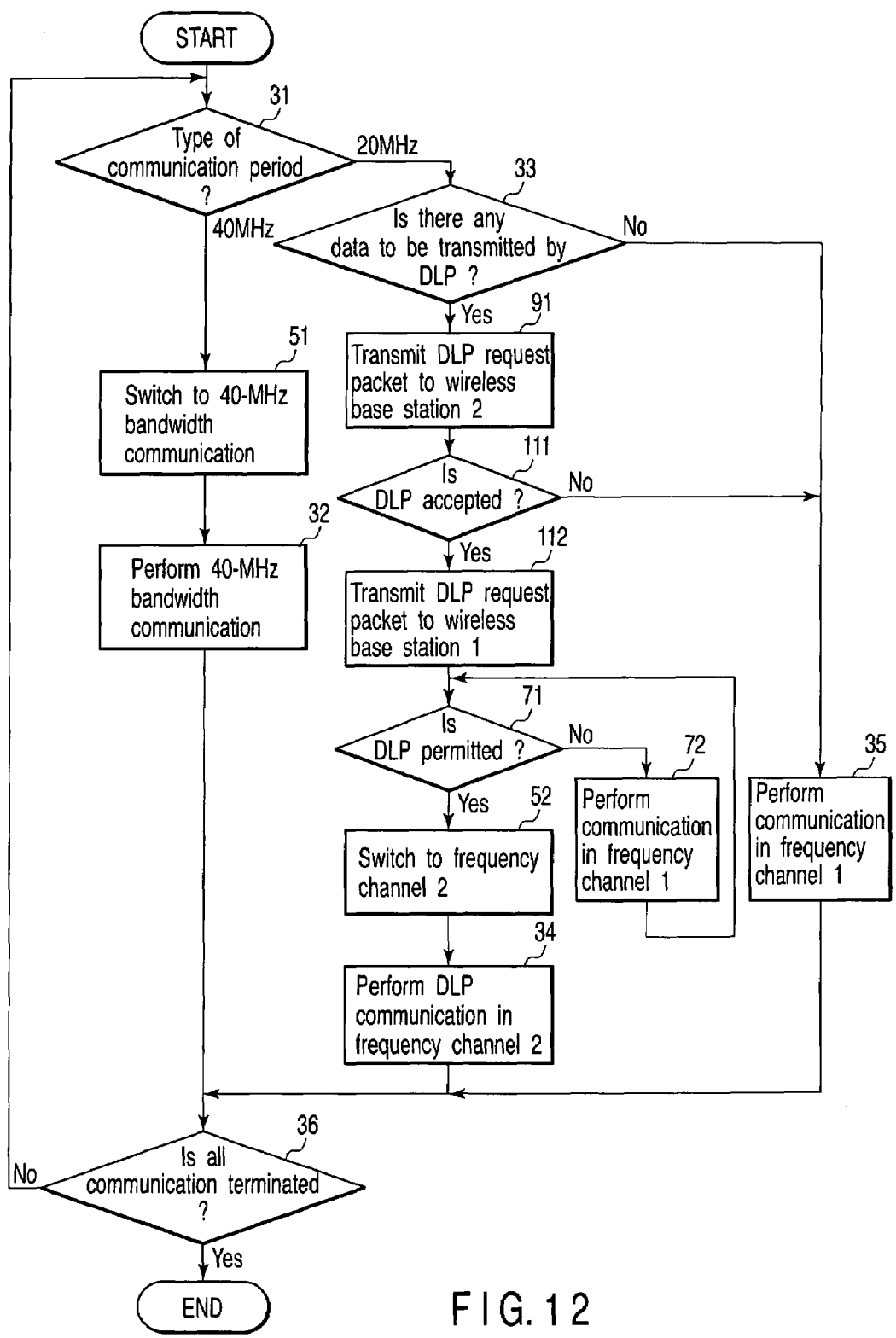

FIG. 12 is a flowchart showing an example of processing operation by the wireless terminal station 2a. The flowchart of FIG. 12 shows processing after the wireless terminal station 2a completes authentication processing with the wireless base station 1 for the transmission of data, registration processing for the wireless base station 1, registration processing of the type of data to be transmitted, and the like. The wireless terminal station 2a discriminates whether the current period is a communication period in which the 20-MHz bandwidth is used or a communication period in which the 40-MHz bandwidth is used (step 31). If the current period is a communication period in which the 40-MHz bandwidth is used, the wireless terminal station 2a switches frequency channels (step 51) and performs communication using the 40-MHz bandwidth (step 32). If it is determined in step 31 that the current period is a communication period in which the 20-MHz bandwidth is used, it is determined whether there is any data to be transmitted by DLP (step 33). If there is data to be transmitted by DLP, a packet containing information indicating a DLP request is transmitted to the wireless terminal station 2b (step 91). Upon transmitting the packet containing information indicating the DLP request to the wireless terminal station 2b, the wireless terminal station 2a determines whether or not the DLP request has been accepted by the wireless terminal station 2b (step 111). If DLP is not accepted, the wireless terminal station 2a performs non-DLP communication in frequency channel 1 (step 35). If DLP is accepted, the wireless terminal station 2a transmits a packet containing information indicating a DLP request to the wireless base station 1 (step 112). Upon transmitting the packet containing information indicating the DLP request to the wireless base station 1, the wireless terminal station 2a determines whether or not information indicating the permission of DLP communication has been received (step 71). If DLP is not permitted, the wireless terminal station 2a performs non-DLP communication in frequency channel 1 (step 72). If DLP is permitted, the wireless terminal station 2a switches the frequency channel to frequency channel 2 (step 52), performs communication by DLP in frequency channel 2 (step 34). If there is no data to be transmitted by DLP, the wireless terminal station 2a performs non-DLP communication in frequency channel 1 (step 35). It is then determined whether or not all the communication is terminated (step 36). If all the communication is to be terminated, the communication is terminated. If the communication is to be continued, the processing in step 31 and the subsequent steps is repeated.

The flowchart of FIG. 12 shows the case wherein a packet containing information indicating whether or not DLP is accepted is received from the wireless terminal station 2b after the wireless terminal station 2a transmits a DLP request to the wireless terminal station 2b. However, the wireless terminal station 2a may set a timer after transmitting a DLP request to the wireless terminal station 2b so that when the timer causes a timeout, the wireless terminal station 2a determines that DLP is rejected by the wireless terminal station 2b.

The above embodiment has exemplified the case wherein the wireless terminal station 2a transmits, to the wireless terminal station 2b, a packet containing information indicating a direct communication request in a communication period in which the 20-MHz bandwidth is used. However, a packet containing information indicating a direct communication request need not always be transmitted in a communication period in which the 20-MHz bandwidth is used, and may be transmitted in a communication period in which the 40-MHz bandwidth is used. In addition, a packet containing information indicating whether or not direct communication is accepted which is transmitted by the wireless terminal station 2b need not always be transmitted in a communication period in which the 20-MHz bandwidth is used, and may be transmitted in a communication period in which the 40-MHz bandwidth is used.

In this manner, only when DLP is accepted by a DLP partner, the wireless terminal station 2a transmits a frame containing information indicating a DLP request to the wireless base station 1. This makes it possible to effectively use the frequency resources while improving the data transmission/reception efficiency.

Better effects can be obtained by making a packet containing information indicating a direct communication request, which is transmitted from the wireless terminal station 2a to the wireless terminal station 2b, contain the number of a frequency channel used for direct communication and the period of direct communication.

Figure 13:
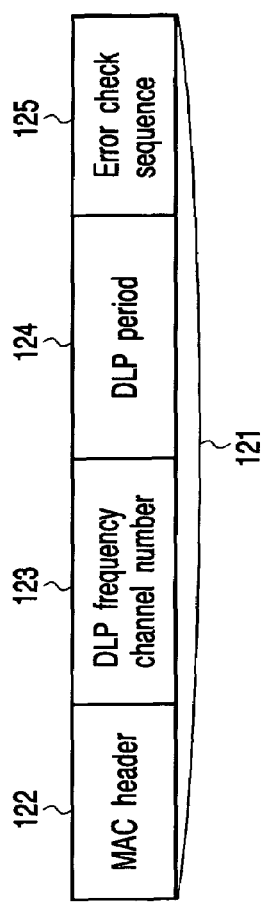
FIG. 13 is a view showing an example of the constituent elements of a packet containing information indicating a direct communication request which a wireless terminal station 2a transmits to a wireless terminal station 2b.

FIG. 13 is a view showing an example of the constituent elements of a packet containing information indicating a direct communication request which the wireless terminal station 2a transmits to the wireless terminal station 2b. Referring to FIG. 13, reference numeral 121 denotes a MAC frame; 122, a MAC header; 123, the number of a frequency channel in which DLP is requested; 124, a period in which DLP is requested; and 125, an error check sequence in the MAC frame.

Upon receiving a DLP request from the wireless terminal station 2a, the wireless terminal station 2b determines, on the basis of the frequency channel number 123 and DLP period 124 for the DLP request in the MAC frame 121 shown in FIG. 13, whether or not DLP is accepted.

In this manner, the determination whether direct communication is accepted which is performed by the wireless terminal station 2b is facilitated by containing the number of a frequency channel in which direct communication is performed and a period in which direct communication is performed in a packet containing information indicating a direct communication request which the wireless terminal station 2a transmits to the wireless terminal station 2b.

Better effects can be obtained by further containing the number of a frequency channel in which direct communication is performed, a period in which direct communication is performed, and the address of the wireless terminal station 2 which performs direct communication in a packet containing information indicating a direct communication request which the wireless terminal station 2a transmits-to the wireless base station 1.

Figure 14:
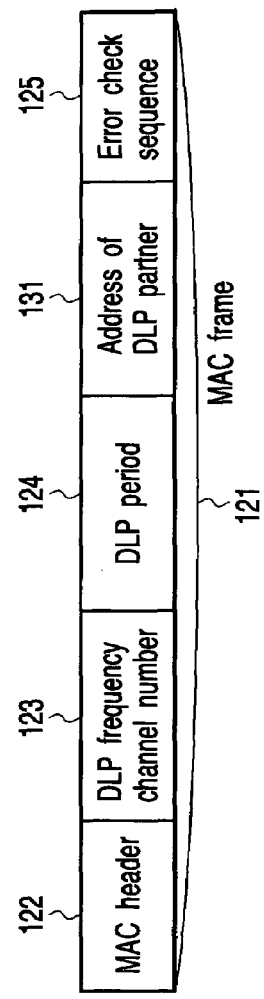
FIG. 14 is a view showing an example of the constituent elements of a packet containing information indicating a direct communication request which the wireless terminal station 2a transmits to the wireless base station 1.

FIG. 14 is a view showing an example of the constituent elements of a packet containing information indicating a direct communication request which the wireless terminal station 2a transmits to the wireless base station 1. Referring to FIG. 14, reference numeral 121 denotes a MAC frame; 122, a MAC header; 123, the number of a frequency channel in which DLP is requested; 124, a period in which DLP is requested; 131, the address of the wireless terminal station 2b which performs DLP; and 125, an error check sequence in the MAC frame.

Upon receiving a DLP request from the wireless terminal station 2a, the wireless base station 1 determines whether DLP is accepted, on the basis of the frequency channel number 123, the DLP period 124, and the address of the wireless terminal station 2b which performs DLP, for the DLP request in the MAC frame 121 shown in FIG. 14.

In this manner, the determination whether direct communication is permitted which is performed by the wireless base station 1 is facilitated by containing the number of a frequency channel in which direct communication is performed, a period in which direct communication is performed, and the address of a direct communication partner in a packet containing information indicating a direct communication request which the wireless terminal station 2a transmits to the wireless base station 1.

Better effects can be obtained by containing the number of a frequency channel in which direct communication is performed, the start time of direct communication, a period in which direct communication is performed, and the address of the wireless terminal station 2 which permits direct communication in a packet containing information indicating the permission of direct communication which the wireless base station 1 transmits.

Figure 15:
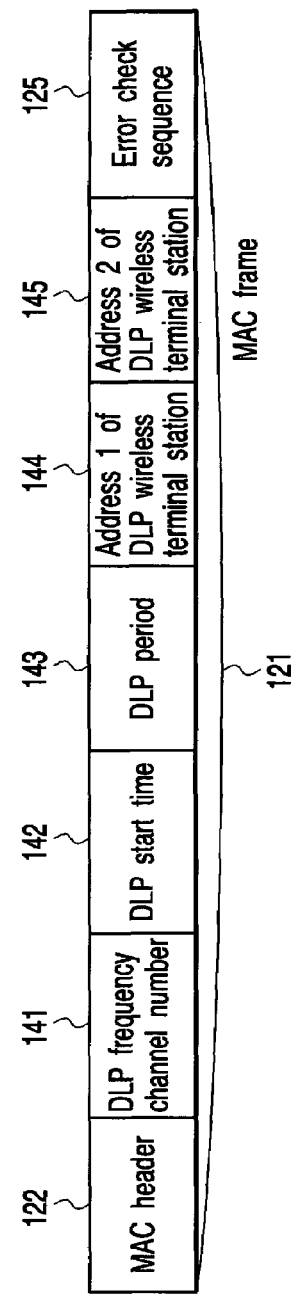
FIG. 15 is a view showing an example of the constituent elements of a packet containing information indicating the permission of direct communication which the wireless base station 1 transmits.

FIG. 15 is a view showing an example of the constituent elements of a packet which is transmitted by the wireless base station 1 and contains information indicating the permission of direct communication. Referring to FIG. 15, reference numeral 121 denotes a MAC frame; 122, a MAC header; 141, the number of a frequency channel in which DLP is permitted; 142, the start time of DLP; 143, a period in which DLP is permitted; 144, the address of the wireless terminal station 2a which is permitted DLP; 144, the address of the wireless terminal station 2b which is permitted DLP; and 125, an error check sequence in the MAC frame.

Upon receiving information indicating the permission of DLP from the wireless base station 1, the wireless terminal station 2 performs communication by DLP on the basis of the frequency channel number 141 corresponding to the permission of DLP, the DLP start time 142, the DLP period 143, and the address of the wireless terminal station 2 for which DLP is permitted, which are set in the MAC frame 121 in shown in FIG. 15.

In this manner, the wireless terminal station 2 can accurately perform communication by DLP by containing the number of a frequency channel in which direct communication is permitted, the start time of direct communication, a period in which direct communication is permitted, and the address of the wireless terminal station 2 which is permitted direct communication in a packet which is transmitted by the wireless base station 1 and contains information indicating the permission of direct communication. Packet exchange can be efficiently performed by allowing another wireless terminal station, which has received a packet which is transmitted by the wireless base station 1 and permits DLP, to obtain information associated with the terminal which is performing direct communication and inhibiting the another wireless terminal station from transmitting a packet to the wireless terminal station which is performing DLP.

SIXTH EMBODIMENT

Packets containing information indicating the permission of direct communication which a wireless base station 1 transmits may be transmitted simultaneously in frequency channels 1 and 2. FIG. 16 is a view showing the sixth example of the packet transmission/reception timing in this embodiment. Referring to FIG. 16, reference numeral 23 denotes a packet transmitted by the wireless base station 1 in FIG. 1; 24, a packet transmitted by the wireless terminal station 2 belonging to the first group in FIG. 1; 41, a packet transmitted by a wireless terminal station 3 belonging to the second group in FIG. 1; and 151, packets containing information indicating the permission of direct communication which the wireless base station 1 simultaneously transmits in frequency channels 1 and 2.

In the case shown in FIG. 16, since the packets containing information indicating the permission of direct communication which the wireless base station 1 transmits are simultaneously transmitted in frequency channels 1 and 2, wireless terminal stations which operate in frequency channel 2 can be also notified of the start of direct communication. Packet exchange can therefore be efficiently performed by inhibiting such wireless terminal stations from transmitting packets to the wireless terminal stations which are performing DLP.

By setting a period in which DLP is permitted as a bandwidth reserved period in one of the packets simultaneously transmitted by the wireless base station in the two frequency channels and containing information indicating the permission of direct communication, which is transmitted in the frequency channel in which direct communication is permitted, wireless terminal stations other than the wireless terminal stations 2 permitted to perform direct communication are inhibited from performing transmission. This makes it possible to reliably perform direct communication without any interference.

SEVENTH EMBODIMENT

FIG. 17 is a view showing the seventh example of the packet transmission/reception timing in this embodiment. Referring to FIG. 17, reference numeral 23 denotes a packet transmitted by a wireless base station 1 in FIG. 1; 24, a packet transmitted by a wireless terminal station 2 belonging to the first group in FIG. 1; 41, a packet transmitted by a wireless terminal station 3 belonging to the second group in FIG. 1; and 161, a packet containing information indicating the declaration of direct communication which the wireless terminal station 2 transmits. Assume that in this embodiment, as in the second embodiment, the wireless terminal station 2 belonging to the first group shown in FIG. 1 can perform communication using the 40-MHz bandwidth and freely switch the frequency channels shown in FIGS. 2A to 2D without any instruction from the wireless base station 1. Assume also that the wireless terminal station 3 belonging to the second group in FIG. 1 can perform only communication using the 20-MHz bandwidth and switch frequency channels in accordance with an instruction from the wireless base station 1 or wireless terminal station 2.

In the case shown in FIG. 17, for example, a wireless terminal station 2a holds data to be transmitted to a wireless terminal station 2b, and hence transmits a packet 10(161) containing information indicating the declaration of communication by DLP. After the packet 10(161) is transmitted by the wireless terminal station 2a, the wireless terminal stations 2a and 2b which can freely switch frequency channels perform direct communication (DLP) in frequency channel 2 without through the wireless base station 1. In frequency channel 1, the wireless base station 1 exchanges packets with the wireless terminal station 2 or 3 which does not perform DLP communication in frequency channel 2.

Figure 18:
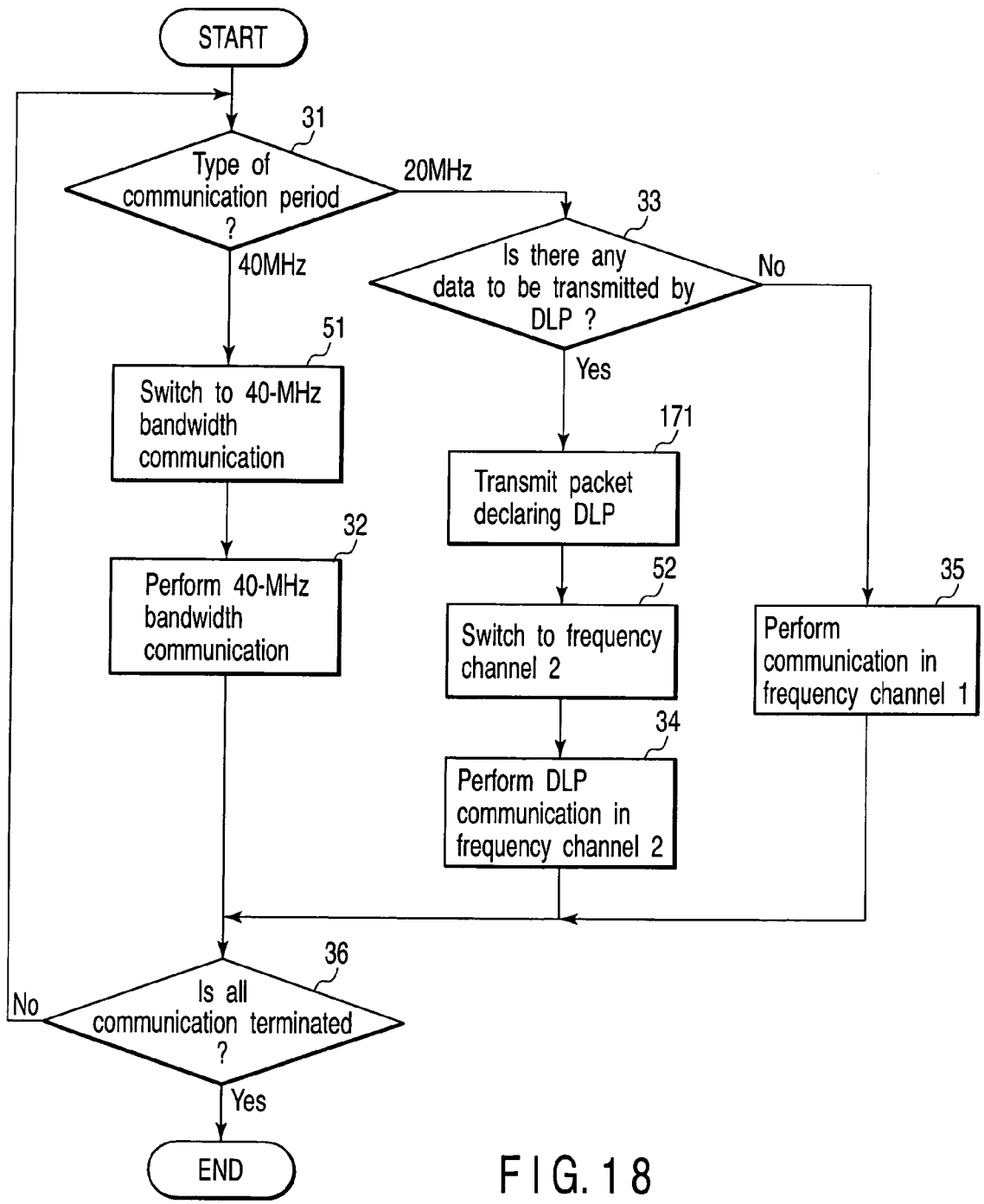

FIG. 18 is a flowchart showing an example of processing operation by the wireless terminal station 2a. The flowchart of FIG. 18 shows processing after the wireless terminal station 2a completes authentication processing with the wireless base station 1 for the transmission of data, registration processing for the wireless base station 1, registration processing of the type of data to be transmitted, and the like. The wireless terminal station 2a discriminates whether the current period is a communication period in which the 20-MHz bandwidth is used or a communication period in which the 40-MHz bandwidth is used (step 31). If the current period is a communication period in which the 40-MHz bandwidth is used, the wireless terminal station 2a switches frequency channels (step 51) and performs communication using the 40-MHz bandwidth (step 32). If it is determined in step 31 that the current period is a communication period in which the 20-MHz bandwidth is used, it is determined whether there is any data to be transmitted by DLP (step 33). If there is data to be transmitted by DLP, a packet containing information indicating the declaration of DLP communication is transmitted (step 171). The wireless terminal station 2a then switches the frequency channel to frequency channel 2 (step 52) and performs communication by DLP in frequency channel 2 (step 34). If it is determined in step 33 that there is no data to be transmitted by DLP, the wireless terminal station 2a performs non-DLP communication in frequency channel 1 (step 35). It is then determined whether or not all the communication is terminated (step 36). If all the communication is to be terminated, the communication is terminated. If the communication is to be continued, the processing in step 31 and the subsequent steps is repeated.

Although the above embodiment has exemplified the case wherein a wireless terminal station transmits a packet containing information indicating the declaration of direct communication in a communication period in which the 20-MHz bandwidth is used, the packet containing information indicating the declaration of direct communication need not always be transmitted in a communication period in which the 20-MHz bandwidth is used, and may be transmitted in a communication period in which the 40-MHz bandwidth is used.

In this manner, the wireless base station 1 communicates with the wireless terminal station 2 or 3 in one frequency channel 1 in a communication period in which the 20-MHz bandwidth is used, and after direct communication is declared in the other frequency channel 2, the wireless terminal station 2 directly communicates with another wireless terminal station without through the wireless base station 1, thereby effectively using the frequency resources while improving the data transmission/reception efficiency.

EIGHTH EMBODIMENT

Figure 19:
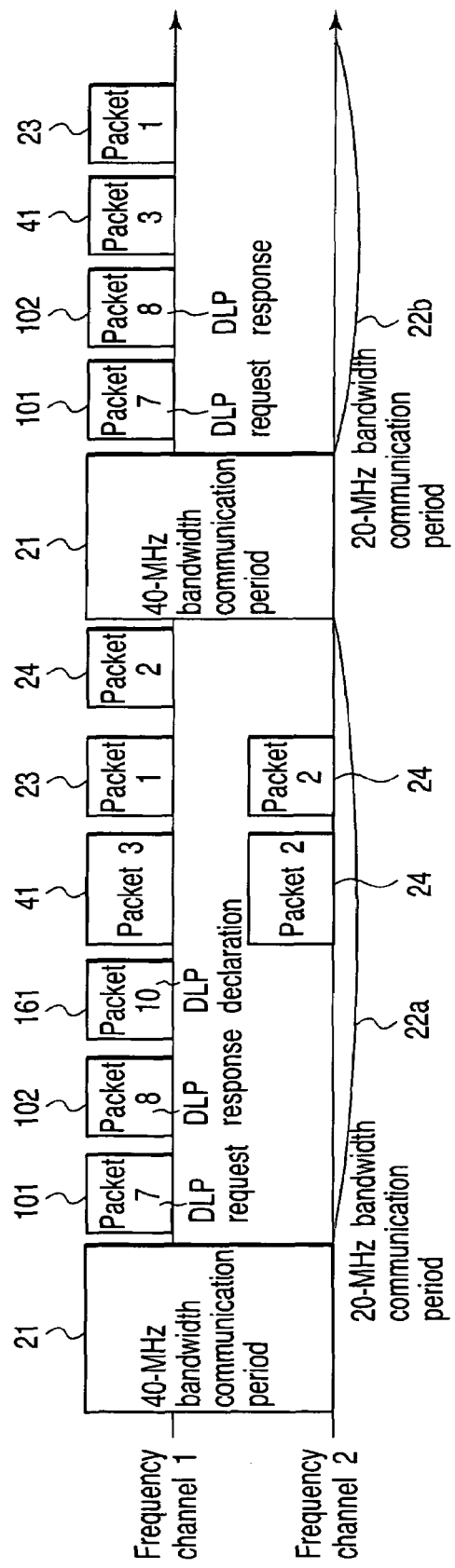
FIG. 19 is a view showing the eighth example of the packet transmission/reception timing according to embodiments of the present invention.

FIG. 19 is a view showing the eighth example of the packet transmission/reception timing in this embodiment. Referring to FIG. 19, reference numeral 21 denotes a communication period in which the 40-MHz bandwidth is used; 22, a communication period in which the 20-MHz bandwidth is used; 23, a packet transmitted by a wireless base station 1 in FIG. 1; 24, a packet transmitted by a wireless terminal station 2 belonging to the first group in FIG. 1; 41, a packet transmitted by a wireless terminal station 3 belonging to the second group in FIG. 1; 101, a packet which the wireless terminal station 2 belonging to the first group transmits to the wireless terminal station 2 belonging to the first group and contains information indicating a direct communication request; 102, a packet containing information indicating whether or not the wireless terminal station 2 belonging to the first group which is requested to perform direct communication accepts direct communication; and 161, a packet containing information indicating the declaration of direct communication which the wireless terminal station 2 transmits. Assume that in this case, as in the second embodiment, the wireless terminal station 2 belonging to the first group in FIG. 1 can perform communication using the 40-MHz bandwidth and freely switch the frequency channels shown in FIGS. 2A to 2D without any instruction from the wireless base station 1. Assume also that the wireless terminal station 3 belonging to the second group in FIG. 1 can perform only communication using the 20-MHz bandwidth and switch frequency channels in accordance with an instruction from the wireless base station 1 or wireless terminal station 2.

In the case shown in FIG. 19, since a wireless terminal station 2a belonging to the first group has a data transmission request addressed to a wireless terminal station 2b belonging to the same first group, the wireless terminal station 2a transmits a packet 7(101) containing information indicating a direct communication request to the wireless terminal station 2b in a communication period 22a in which the 20-MHz bandwidth is used. Upon receiving the direct communication request from the wireless terminal station 2a, the wireless terminal station 2b determines whether or not to accept direct communication, and transmits, to the wireless terminal station 2a, a packet 8(102) containing information indicating whether or not to accept direct communication. Upon receiving a packet containing information indicating the acceptance of direct communication from the wireless terminal station 2b, the wireless terminal station 2a transmits a packet 10(161) containing information indicating the declaration of direct communication. After the packet 10(161) is transmitted by the wireless terminal station 2a, the wireless terminal station 2 which can freely switch frequency channels performs direct communication (DLP) with another wireless terminal station in frequency channel 2 without through the wireless base station 1. In frequency channel 1, the wireless base station 1 exchanges packets with the wireless terminal station 2 or 3 which does not perform DLP communication in frequency channel 2. In a communication period 22b in which the 20-MHz bandwidth is used, the wireless terminal station 2a transmits the packet 7(101) containing information indicating a direct communication request to the wireless terminal station 2b. In this case, however, since the wireless terminal station 2b determines the rejection of direct communication and transmits the packet 8(102) containing information indicating the rejection of direct communication, the wireless terminal station 2a does not transmit the packet 10(161) containing information indicating the declaration of direct communication.

Figure 20:
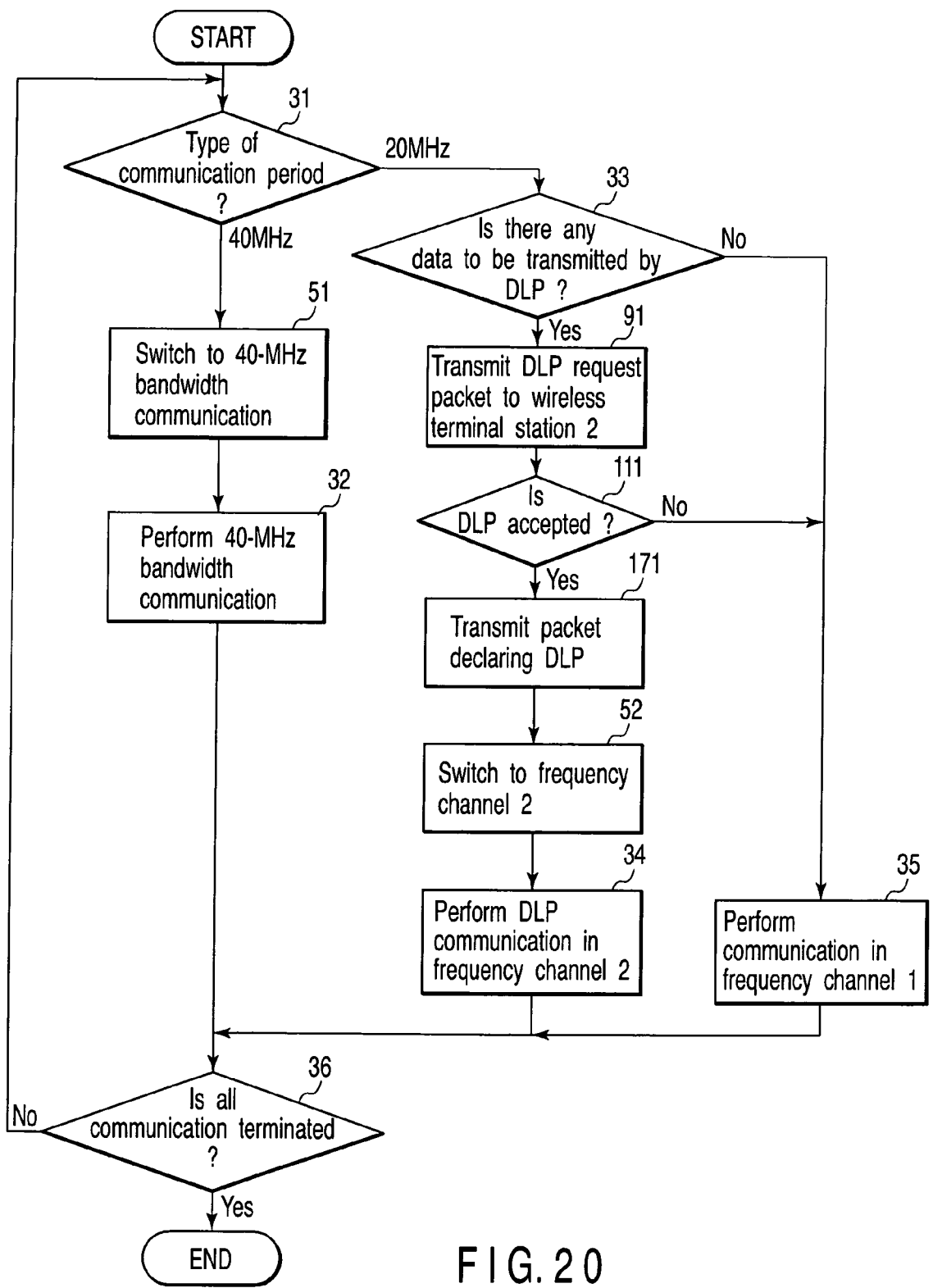

FIG. 20 is a flowchart showing an example of processing operation by the wireless terminal station 2a. The flowchart of FIG. 20 shows processing after the wireless terminal station 2a completes authentication processing with the wireless base station 1 for the transmission of data, registration processing for the wireless base station 1, registration processing of the type of data to be transmitted, and the like. The wireless terminal station 2a discriminates whether the current period is a communication period in which the 20-MHz bandwidth is used or a communication period in which the 40-MHz bandwidth is used (step 31). If the current period is a communication period in which the 40-MHz bandwidth is used, the wireless terminal station 2a switches frequency channels (step 51) and performs communication using the 40-MHz bandwidth (step 32). If it is determined in step 31 that the current period is a communication period in which the 20-MHz bandwidth is used, it is determined whether there is any data to be transmitted by DLP (step 33). If there is data to be transmitted by DLP, a packet containing information indicating a DLP request is transmitted to the wireless terminal station 2b (step 91). Upon transmitting the packet containing the information indicating the DLP request to the wireless terminal station 2b, the wireless terminal station 2a determines whether or not the DLP request is accepted by the wireless terminal station 2b (step 111). If DLP is not accepted, the wireless terminal station 2a performs non-DLP communication in frequency channel 1 (step 35). If DLP is accepted, the wireless terminal station 2a transmits a packet containing information indicating the declaration of DLP communication (step 171). The wireless terminal station 2a then switches the frequency channel to frequency channel 2 (step 52) and performs communication by DLP in frequency channel 2 (step 34). If it is determined in step 33 that there is no data to be transmitted by DLP, the wireless terminal station 2a performs non-DLP communication in frequency channel 1 (step 35). It is then determined whether or not all the communication is terminated (step 36). If all the communication is to be terminated, the communication is terminated. If the communication is to be continued, the processing in step 31 and the subsequent steps is repeated.

The flowchart shown in FIG. 20 has exemplified the case wherein upon transmitting the DLP request to the wireless terminal station 2b, the wireless terminal station 2a receives, from the wireless terminal station 2b, the packet containing information indicating whether or not DLP is accepted. However, the wireless terminal station 2a may sets a timer after transmitting a DLP request to the wireless terminal station 2b so that when the timer causes a timeout, the wireless terminal station 2a determines that DLP is rejected by the wireless terminal station 2b.

The above embodiment has exemplified the case wherein the wireless terminal station 2a transmits, to the wireless terminal station 2b, a packet containing information indicating a direct communication request in a communication period in which the 20-MHz bandwidth is used. However, a packet containing information indicating a direct communication request need not always be transmitted in a communication period in which the 20-MHz bandwidth is used, and may be transmitted in a communication period in which the 40-MHz bandwidth is used. In addition, a packet containing information indicating whether or not direct communication is accepted which is transmitted by the wireless terminal station 2b need not always be transmitted in a communication period in which the 20-MHz bandwidth is used, and may be transmitted in a communication period in which the 40-MHz bandwidth is used.

In this manner, only when DLP is accepted by a DLP partner, the wireless terminal station 2a transmits a frame containing information indicating the declaration of DLP. This makes it possible to effectively use the frequency resources while improving the data transmission/reception efficiency.

Better effects can be obtained by making a packet containing information indicating a direct communication request, which is transmitted from the wireless terminal station 2a to the wireless terminal station 2b, contain the number of a frequency channel used for direct communication and a period in which direct communication is performed.

FIG. 21 is a view showing an example of the constituent elements of a packet containing information indicating a direct communication request which the wireless terminal station 2a transmits to the wireless terminal station 2b. Referring to FIG. 21, reference numeral 121 denotes a MAC frame; 122, a MAC header; 123, the number of a frequency channel in which DLP is requested; 124, a period in which DLP is requested; and 125, an error check sequence in the MAC frame.

Upon receiving a DLP request from the wireless terminal station 2a, the wireless terminal station 2b determines, on the basis of the frequency channel number 123 and DLP period 124 for the DLP request in the MAC frame 121 shown in FIG. 21, whether or not DLP is accepted.

In this manner, the determination whether direct communication is accepted which is performed by the wireless terminal station 2b is facilitated by containing the number of a frequency channel in which direct communication is performed and a period in which direct communication is performed in a packet containing information indicating a direct communication request which the wireless terminal station 2a transmits to the wireless terminal station 2b.

Better effects can be obtained by further containing the number of a frequency channel in which direct communication is performed, a period in which direct communication is performed, and the address of the wireless terminal station 2 which permits direct communication in a packet which the wireless terminal station 2a transmits.

FIG. 15, which is already shown, is a view showing an example of the constituent elements of a packet containing information indicating the declaration of direct communication request which the wireless terminal station 2a transmits. Referring to FIG. 22, reference numeral 121 denotes a MAC frame; 122, a MAC header; 141, the number of a frequency channel in which DLP is permitted; 142, the start time of DLP; 143, a period in which DLP is permitted; 144, the address of the wireless terminal station 2a which is permitted DLP; 145, the address of the wireless terminal station 2b which is permitted DLP; and 125, an error check sequence in the MAC frame.

Upon receiving the declaration of DLP from the wireless terminal station 2a, the wireless terminal station 2 performs communication by DLP on the basis of the frequency channel number 141 for which DLP is permitted, in the MAC frame 121 shown in FIG. 22, the DLP start time 142, the DLP period 143, and the address of the wireless terminal station 2 which is permitted to perform DLP.

In this manner, the wireless terminal station 2 can accurately perform communication by DLP by containing the number of a frequency channel in which direct communication is permitted, the start time of direct communication, a period in which direct communication is permitted, and the address of the wireless terminal station 2 which permits direct communication in a packet which is transmitted by the wireless terminal station 2a and contains information indicating the declaration of direct communication. In addition, packet exchange can be efficiently performed by allowing another wireless terminal station, which has received a packet which is transmitted by the wireless terminal station 2a and declares DLP, to obtain information associated with the terminal which is performing direct communication and inhibiting the another wireless terminal station from transmitting a packet to the wireless terminal station which is performing DLP.

NINTH EMBODIMENT

FIG. 22 is a view showing the ninth example of the packet transmission/reception timing in this embodiment. Referring to FIG. 22, reference numeral 21 denotes a communication period in which the 40-MHz bandwidth is used; 22, a communication period in which the 20-MHz bandwidth is used; 23, a packet transmitted by a wireless base station 1 in FIG. 1; 24, a packet transmitted by a wireless terminal station 2 belonging to the first group in FIG. 1; 41, a packet transmitted by a wireless terminal station 3 belonging to the second group in FIG. 1; 61, a packet which is transmitted by the wireless base station 1 and contains information indicating a direct communication request; 181 and 182, packets directly communicated by the wireless terminal station 2 in a communication period 22a in which the 20-MHz bandwidth is used; and 183 and 184, packets directly communicated by the wireless terminal station 2 in a communication period 22b in which the 20-MHz bandwidth is used. Assume that in this case, as in the second embodiment, the wireless terminal station 2 belonging to the first group in FIG. 1 can perform communication using the 40-MHz bandwidth and freely switch the frequency channels shown in FIG. 2 without any instruction from the wireless base station 1. Assume also that the wireless terminal station 3 belonging to the second group in FIG. 1 can perform only communication using the 20-MHz bandwidth and can switch frequency channels in accordance with an instruction from the wireless base station 1 or wireless terminal station 2.

In the case shown in FIG. 22, in the communication period 22a in which the 20-MHz bandwidth is used, wireless terminal stations 2a and 2b perform direct communication in frequency channel 2, and a communication period in which the 40-MHz bandwidth is used starts while data to be transmitted by direct communication is left. If, for example, the control field of a packet includes a field indicating the presence of succeeding data, like MoreData bit in an IEEE 802.11 wireless LAN, the presence of the succeeding data can be indicated by using the field. In this case, it is determined in advance that when a communication period in which the 20-MHz bandwidth is used ends at a packet indicating the presence of succeeding data, the frequency channel is automatically switched to frequency channel 2 and direct communication is resumed at the start of the next communication period in which the 20-MHz bandwidth is used. Since a last packet 2(182) in direct communication in the communication period 22a indicates the presence of succeeding data, the wireless terminal station 2 which has performed direct communication in the communication period 22a switches the frequency channel to frequency channel 2 and performs direct communication at the start of the next communication period 22b in which the 20-MHz bandwidth is used.

In this manner, when a communication period in which the 20-MHz bandwidth is used ends while the presence of succeeding data is indicated, packet exchange can be efficiently performed by automatically performing direct communication in frequency channel 2 during the communication period in which the 20-MHz bandwidth is used.

In the above case, in the first communication period in which the 20-MHz bandwidth is used, succeeding data cannot be transmitted by direct communication. However, this is not limited to a communication period in which the 20-MHz bandwidth is used. That is, when succeeding data cannot be transmitted by direct communication in a communication period in which the 40-MHz bandwidth is used, the direct communication may be continued in a communication period in which the 20-MHz bandwidth is used.

10th EMBODIMENT

FIG. 23 is a view showing the 10th example of the packet transmission/reception timing in this embodiment. Referring to FIG. 23, reference numeral 21 denotes a communication period in which the 40-MHz bandwidth is used; 22, a communication period in which the 20-MHz bandwidth is used; 191, a packet by which the wireless base station 1 gives a transmission right to a wireless terminal station 2a; 192, a packet by which the wireless terminal station 2a transmits a direct communication request to a wireless terminal station 2b; 193, a response packet to the direct communication request which the wireless terminal station 2b transmits to the wireless terminal station 2a; 194, a packet by which the wireless base station 1 cancels the transmission right given to the wireless terminal station 2a; and 195 and 196, packets transmitted by direct communication by the wireless terminal stations 2a and 2b in frequency channel 2. Assume that in this case, as in the second embodiment, a wireless terminal station 2 belonging to the first group in FIG. 1 can perform communication using the 40-MHz bandwidth and freely switch the frequency channels shown in FIGS. 2A to 2D without any instruction from the wireless base station 1. Assume also that a wireless terminal station 3 belonging to the second group in FIG. 1 can perform only communication using the 20-MHz bandwidth and switch frequency channels in accordance with an instruction from the wireless base station 1 or wireless terminal station 2.

In the case shown in FIG. 23, in a communication period 22a in which the 20-MHz bandwidth is used, the wireless terminal station 2a obtains a transmission right from the wireless base station 1, and transmits the packet 192 which requests the wireless terminal station 2b to perform direct communication in a period in which the transmission right is held. The wireless terminal station 2b which has been requested to perform direct communication by the wireless terminal station 2a transmits the response packet 193 indicating the acceptance of direct communication to the wireless terminal station 2a when accepting direct communication. The wireless terminal station 2b which has transmitted the response indicating the acceptance of direct communication and the wireless terminal station 2a which has received the response indicating the acceptance of direct communication switch the frequency channel to frequency channel 2 and perform direct communication. Since the transmission right given to the wireless terminal station 2a is left in frequency channel 1, the wireless base station 1 transmits the packet 194 for canceling the transmission right given to the wireless terminal station 2a, thereby canceling the transmission right given to the wireless terminal station 2a in frequency channel 1.

In this manner, when the wireless terminal station 2a to which a transmission right is given in frequency channel 1 needs to perform direct communication, the wireless terminal station 2a transmits a direct communication request to the wireless terminal station 2b in frequency channel 1 in a period in which the transmission right is held. When the direct communication request is accepted, direct communication is performed in frequency channel 2, thereby effectively using the frequency channels.

In addition, after the wireless terminal station 2a switches the frequency channel to frequency channel 2, the wireless base station 1 cancels the transmission right given to the wireless terminal station 2a in frequency channel 1, thereby effectively using the frequency channels.

11th EMBODIMENT

FIG. 24 is a view showing the 11th example of the packet transmission/reception timing in this embodiment. Referring to FIG. 24, reference numeral 21 denotes a communication period in which the 40-MHz bandwidth is used; 22, a communication period in which the 20-MHz bandwidth is used; 201, a packet by which a wireless base station 1 gives a transmission right to a wireless terminal station 3a; 202, the duration of the transmission right which is given to the wireless terminal station 3a by the wireless base station 1; and 203 an 204, packets which are transmitted by direct communication by wireless terminal stations 2a and 2b in frequency channel 2. Assume that in this case, as in the second embodiment, a wireless terminal station 2 belonging to the first group in FIG. 1 can perform communication using the 40-MHz bandwidth and freely switch the frequency channels shown in FIGS. 2A to 2D without any instruction from the wireless base station 1. Assume also that a wireless terminal station 3 belonging to the second group in FIG. 1 can perform only communication using the 20-MHz bandwidth and switch frequency channels in accordance with an instruction from the wireless base station 1 or wireless terminal station 2.

In the case shown in FIG. 24, in a communication period 22a in which the 20-MHz bandwidth is used, the wireless terminal station 3a obtains a transmission right from the wireless base station 1 and keeps it for a period 202. In frequency channel 1, the wireless terminal stations 2a and 2b to which no transmission right is given by the wireless base station 1 switch the frequency channel to frequency channel 2 and perform direct communication for the transmission right continuation time 202 given by the wireless terminal station 3a.

In the above case, the wireless base station 1 gives a transmission right to the wireless terminal station 3a. However, the wireless base station 1 may give a transmission right to any of the wireless terminal stations.

In this manner, performing direct communication in frequency channel 2 for the transmission right continuation period given by the wireless terminal station 3 in frequency channel 1 makes it possible to effectively use frequency channels.

Figure 25:
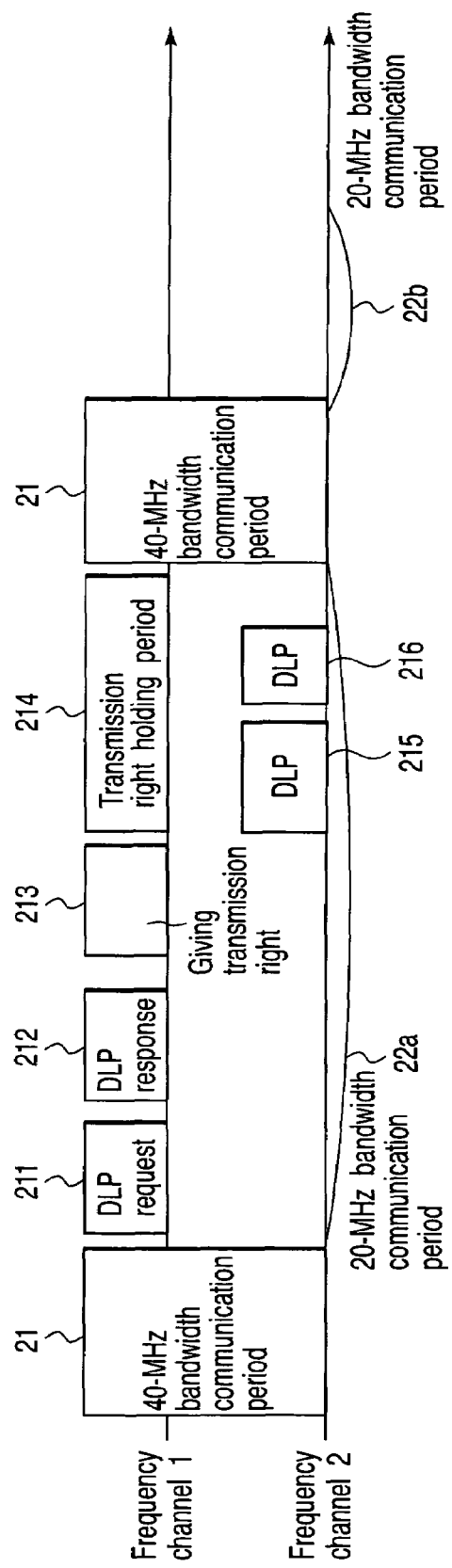
FIG. 25 is a view showing the 12th example of the packet transmission/reception timing according to embodiments of the present invention.

The above direct communication in frequency channel 2 may be performed after prior negotiation. FIG. 25 is a view showing the 12th example of the packet transmission/reception timing in this embodiment. Referring to FIG. 25, reference numeral 21 denotes a communication period in which the 40-MHz bandwidth is used; 22, a communication period in which the 20-MHz bandwidth is used; 211, a direct communication request packet transmitted from the wireless terminal station 2a to the wireless terminal station 2b; 212, a response packet to the direct communication request which is transmitted from the wireless terminal station 2b to the wireless terminal station 2a; 213, a packet by which the wireless base station 1 gives a transmission right to the wireless terminal station 3a; 214, the duration of the transmission right which the wireless terminal station 3a has obtained from the wireless base station 1; and 215 and 216, packets which are transmitted by direct communication by the wireless terminal stations 2a and 2b in frequency channel 2. Assume that in this case, as in the second embodiment, a wireless terminal station 2 belonging to the first group in FIG. 1 can perform communication using the 40-MHz bandwidth and freely switch the frequency channels shown in FIGS. 2A to 2D without any instruction from the wireless base station 1. Assume also that a wireless terminal station 3 belonging to the second group in FIG. 1 can perform only communication using the 20-MHz bandwidth and switch frequency channels in accordance with an instruction from the wireless base station 1 or wireless terminal station 2.

In the case shown in FIG. 25, in the communication period 22a in which the 20-MHz bandwidth is used, the wireless terminal station 2a transmits the direct communication request packet 211 to the wireless terminal station 2b. Upon receiving the direct communication request from the wireless terminal station 2a, the wireless terminal station 2b transmits, to the wireless terminal station 2a, the response packet 212 indicating that direct communication is accepted when accepting direct communication. If the wireless terminal station 2b rejects direct communication, the wireless terminal station 2b transmits a response packet indicating the rejection of direct communication to the wireless terminal station 2a. The wireless terminal station 2b which has accepted direct communication and the wireless terminal station 2a which has received the response indicating the acceptance of direct communication switch the frequency channel to frequency channel 2 and perform direct communication in the duration 214 of the transmission right given to the wireless terminal station 3a by the wireless base station 1.

In the above case, the wireless base station 1 gives a transmission right to the wireless terminal station 3a. However, the wireless base station 1 may give a transmission right to any of the wireless terminal stations.

In addition, the wireless terminal stations 2a and 2b may perform negotiation for direct communication in a communication period in which the 20-MHz bandwidth is used or a communication period n in which the 40-MHz bandwidth is used.

The frequency channels can be effectively used by performing negotiation for direct communication in advance and performing direct communication in frequency channel 2 in the transmission right duration given to the wireless terminal station 3 in frequency channel 1 in this manner.

Figure 26:
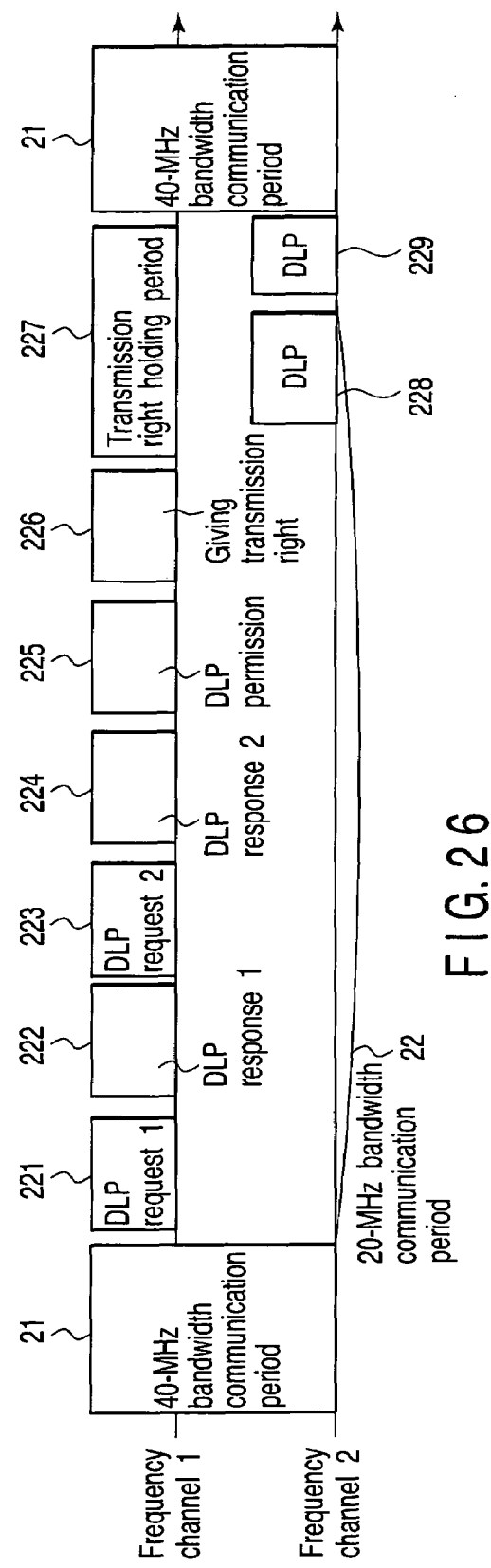
FIG. 26 is a view showing the 13th example of the packet transmission/reception timing according to embodiments of the present invention.

Prior negotiation may be performed a plurality of number of times for direct communication in frequency channel 2. FIG. 26 is a view showing the 13th example of the packet transmission/reception timing in this embodiment. Referring to FIG. 26, reference numeral 21 denotes a communication period in which the 40-MHz bandwidth is used; 22, a communication period in which the 20-MHz bandwidth is used; 221, a direct communication request packet transmitted from the wireless terminal station 2a to the wireless terminal station 2b; 222, a response packet to the direct communication request which is transmitted from the wireless terminal station 2b to the wireless terminal station 2a; 223, a direct communication request packet transmitted from a wireless terminal station 2c to a wireless terminal station 2d; 224, a response packet to the direct communication request which is transmitted from the wireless terminal station 2d to the wireless terminal station 2c; 225, a packet by which the wireless base station 1 gives the permission of direct communication to the wireless terminal stations 2c and 2d; 226, a packet by which the wireless base station 1 gives a transmission right to the wireless terminal station 3a; 227, the duration of the transmission right given to the wireless terminal station 3a by the wireless base station 1; and 228 and 229, packets transmitted by direct communication performed by the wireless terminal stations 2c and 2d in frequency channel 2. Assume that in this case, as in the second embodiment, a wireless terminal station 2 belonging to the first group in FIG. 1 can perform communication using the 40-MHz bandwidth and freely switch the frequency channels shown in FIGS. 2A to 2D without any instruction from the wireless base station 1. Assume also that a wireless terminal station 3 belonging to the second group in FIG. 1 can perform only communication using the 20-MHz bandwidth and switch frequency channels in accordance with an instruction from the wireless base station 1 or wireless terminal station 2.

In the case shown in FIG. 26, in the communication period 22 in which the 20-MHz bandwidth is used, the wireless terminal station 2a transmits the direct communication request packet 221 to the wireless terminal station 2b. Upon receiving the direct communication request from the wireless terminal station 2a, the wireless terminal station 2b transmits the response packet 222 indicating the acceptance of direct communication to the wireless terminal station 2a when accepting direct communication. If the wireless terminal station 2b does not accept direct communication, the wireless terminal station 2b transmits a response packet indicating the rejection of direct communication to the wireless terminal station 2a. Subsequently, the wireless terminal station 2c transmits the direct communication request packet 223 to the wireless terminal station 2d. Upon receiving the direct communication request from the wireless terminal station 2c, the wireless terminal station 2d transmits the response packet 224 indicating the acceptance of direct communication to the wireless terminal station 2c when accepting direct communication. If the wireless terminal station 2d rejects direct communication, the wireless terminal station 2d transmits a response packet indicating the rejection of direct communication to the wireless terminal station 2c. The wireless base station 1 determines a pair of wireless terminal stations which are permitted to perform direct communication, in accordance with the contents of a plurality of negotiations for direct communication, and transmits the packet 225 indicating the permission of direct communication. Upon receiving the permission of direct communication from the wireless base station 1, the wireless terminal stations 2c and 2d switch the frequency channel to frequency channel 2 and perform direct communication for the transmission right continuation time 227 given to the wireless terminal station 3a by the wireless base station 1.

In the above case, the wireless base station 1 gives a transmission right to the wireless terminal station 3a. However, the wireless base station 1 may give a transmission right to any wireless terminal station.

Negotiation for direct communication between the wireless terminal stations 2a and 2b and width negotiation for direct communication between the wireless terminal stations 2c and 2d may be performed in a communication period in which the 20-MHz bandwidth is used or a communication period in which the 40-MHz bandwidth is used.

As described above, even if a plurality of prior negotiations for direct communication are performed, direct communication can be efficiently performed in frequency channel 2 by making the wireless base station 1 give a permission upon making determination from the contents of the negotiations.

(Arrangement of Wireless Terminal Station)

Figure 27:
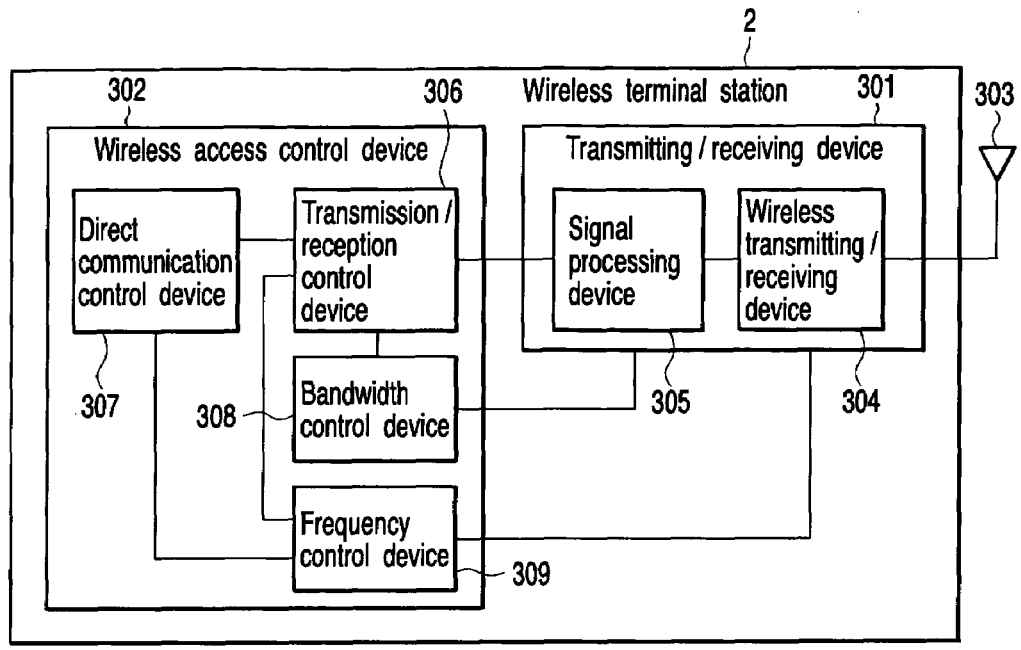
FIG. 27 is a block diagram showing an example of the internal arrangement of a wireless terminal station 2 according to embodiments of the present invention.

FIG. 27 is a block diagram showing an example of the internal arrangement of a wireless terminal station 2 according to an embodiment of the present invention. The wireless terminal station 2 in FIG. 27 comprises an antenna 303, transmitting/receiving device 301, and wireless access control device 302. The transmitting/receiving device 301 comprises a wireless transmitting/receiving device 304 which performs processing such as frequency conversion between a carrier frequency and a baseband signal, filter processing, power amplification, digital/analog conversion, and analog/digital conversion, and a signal processing device 305 which performs digital signal processing. The wireless access control device 302 comprises a transmission/reception control device 306 which controls the generation of transmission and reception packets and the transmission and reception of packets, a direct communication control device 307 which determines direct communication between wireless terminal stations, a bandwidth control device 308 which controls the frequency bandwidth, and a frequency control device 309 which switches frequencies.

Figure 28:
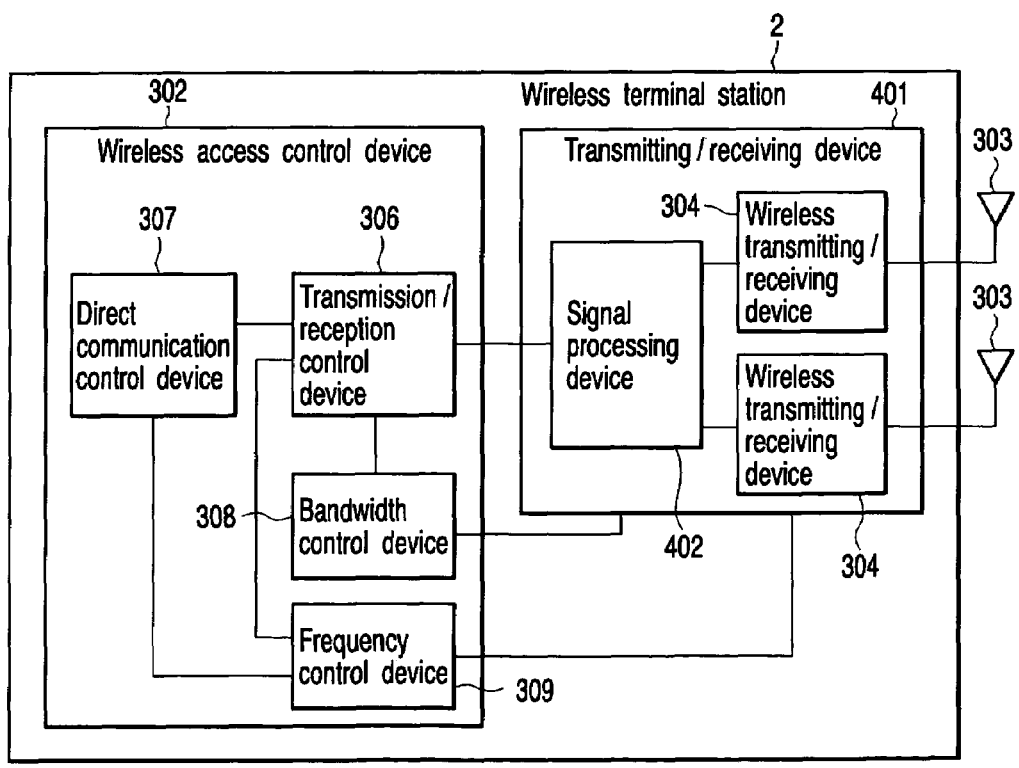
FIG. 28 is a block diagram showing another example of the internal arrangement of the wireless terminal station 2 according to embodiments of the present invention.

The wireless terminal station 2 may have an arrangement like that shown in FIG. 28. The arrangement shown in FIG. 28 differs from that shown in FIG. 27 in that a transmitting/receiving device 401 in FIG. 28 includes two wireless transmitting/receiving devices 304, and has a signal processing device 402 for additional processing due to the two wireless transmitting/receiving devices 304.

(Arrangement of Wireless Base Station)

Figure 29:
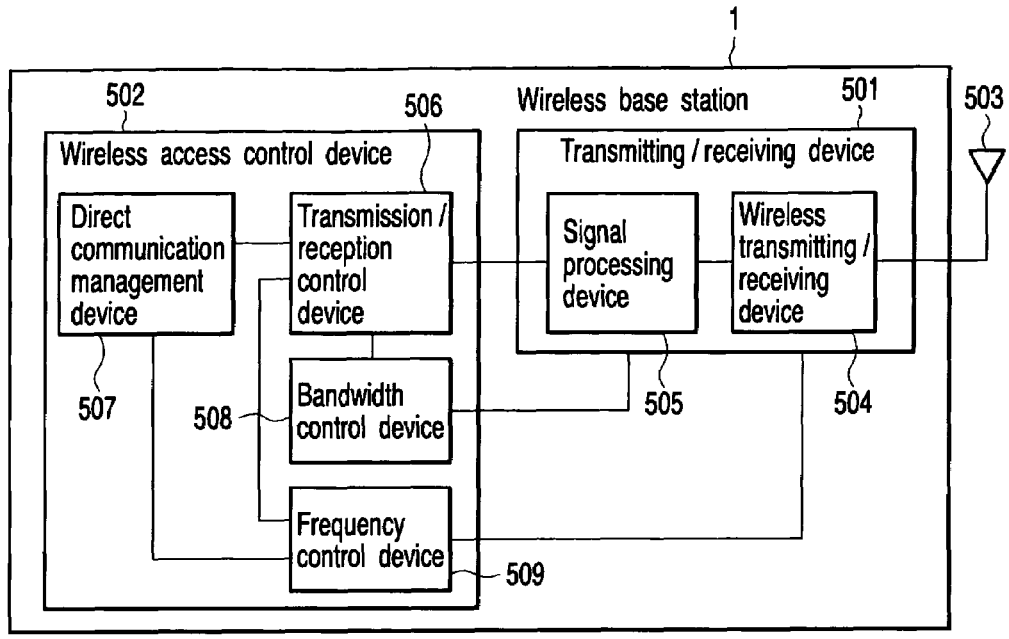
FIG. 29 is a block diagram showing an example of the internal arrangement of a wireless base station 1 according to embodiments of the present invention.

FIG. 29 is a block diagram showing an example of the internal arrangement of a wireless base station 1 according to an embodiment of the present invention. The wireless base station 1 in FIG. 29 comprises an antenna 503, transmitting/receiving device 501, and wireless access control device 502. The transmitting/receiving device 501 comprises a wireless transmitting/receiving device 504 which performs processing such as frequency conversion between a carrier frequency and a baseband signal, filter processing, power amplification, digital/analog conversion, and analog/ digital conversion, and a signal processing device 505 which performs digital signal processing. The wireless access control device 502 comprises a transmission/reception control device 506 which controls the generation of transmission and reception packets and the transmission and reception of packets, a direct communication management device 507 which permits direct communication between terminal stations, a bandwidth control device 508 which control the frequency bandwidth, and a frequency control device 509 which switches frequencies.

Figure 30:
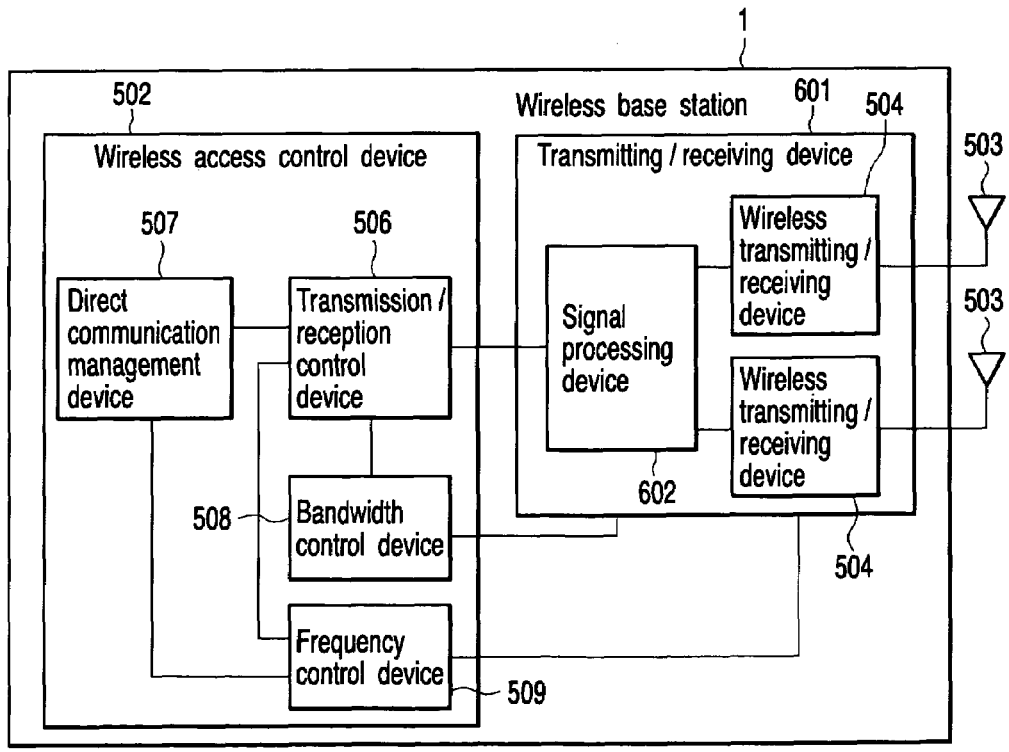
FIG. 30 is a block diagram showing another example of the internal arrangement of the wireless base station 1 according to embodiments of the present invention.

The wireless base station may have an arrangement like that shown in FIG. 30. The arrangement shown in FIG. 30 differs from that shown in FIG. 29 in that a transmitting/receiving device 601 in FIG. 30 includes two wireless transmitting/receiving devices 504, and has a signal processing device 602 for additional processing due to the two wireless transmitting/receiving devices 304.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication method of a wireless communication system having a wireless base station, wireless terminal stations belonging to a first group and which are capable of performing wireless communication by using both a first frequency channel and a second frequency channel, and wireless terminal stations belonging to a second group and which are capable of performing wireless communication by using only the first frequency channel, the method comprising:
   communicating between at least one wireless terminal station belonging to the first group and the wireless base station by using both the first frequency channel and the second frequency channel in a first communication period;
   communicating between at least one wireless terminal station belonging to the second group and the wireless base station by using the first frequency channel in a second communication period; and
   at least two wireless terminal stations belonging to the first group performing direct communication by using the second frequency channel without communicating through the wireless base station in the second communication period.

2. A method according to claim 1, wherein the direct communication between the wireless terminal stations without through the wireless base station is started after the wireless base station transmits a frame containing information indicating permission of direct communication in the first frequency channel.

3. A method according to claim 2, wherein the frame containing the information indicating the permission of direct communication is transmitted after the wireless base station receives a frame containing information indicating a direct communication request from a wireless terminal station belonging to the first group.

4. A method according to claim 3, wherein the frame containing the information indicating the direct communication request which the wireless terminal station belonging to the first group transmits to the wireless base station is transmitted after a first wireless terminal station belonging to the first group transmits a frame containing information indicating a direct communication request to a second wireless terminal station belonging to the first group which is requested to perform direct communication, and the first wireless terminal station receives a frame containing information indicating acceptance of direct communication from the second wireless terminal station.

5. A method according to claim 4, wherein the information of the frame indicating the direct communication request which the first wireless terminal station transmits to the second wireless terminal station which is requested to perform direct communication contains at least one of a number of a frequency channel in which direct communication is performed and a period in which direct communication is performed.

6. A method according to claim 3, wherein the information of the frame indicating the direct communication request contains a number of a frequency channel in which direct communication is performed, a period in which a wireless terminal station belonging to the first group performs direct communication, and an identifier of the wireless terminal station belonging to the first group which performs direct communication.

7. A method according to claim 2, wherein the information of the frame indicating the permission of direct communication which the wireless base station transmits in the first frequency channel contains a start time of direct communication performed by a wireless terminal station belonging to the first group, a period in which the wireless terminal station belonging to the first group performs direct communication, a number of a frequency channel in which the wireless terminal station belonging to the first group performs direct communication, and an identifier of the wireless terminal station belonging to the first group which performs direct communication.

8. A method according to claim 2, wherein frames indicating the permission of direct communication which the wireless base station transmits are simultaneously transmitted in the first frequency channel and the second frequency channel.

9. A method according to claim 8, wherein the frame indicating the permission of direct communication which is transmitted in at least the second frequency channel contains information indicating that a time during which direct communication is performed is reserved in advance.

10. A method according to claim 1, wherein direct communication between wireless terminal stations without through the wireless base station is started after a wireless terminal station belonging to the first group transmits a frame containing information indicating declaration of direct communication in the first frequency channel.

11. A wireless communication terminal used as a wireless terminal station belonging to the first group which performs direct communication without through the wireless base station in a wireless communication system defined in claim 1.

12. A wireless communication system, comprising:
   a wireless base station,
   wireless terminal stations belonging to a first group and which are capable of performing wireless communication by using both a first frequency channel and a second frequency channel, and
   wireless terminal stations belonging to a second group and which are capable of performing wireless communication by using only the first frequency channel, wherein
   at least one wireless terminal station belonging to the first group is configured to communicate with the wireless base station by using both the first frequency channel and the second frequency channel in a first communication period, at least one wireless terminal station belonging to the second group is configured to communicate with the wireless base station by using a first frequency channel in a second communication period, and at least two wireless terminal stations belonging to the first group are configured to perform direct communication by using the second frequency channel without communicating through the wireless base station in the second communication period.

* * * * *